(12) United States Patent
Griot et al.

(10) Patent No.: US 10,231,250 B2
(45) Date of Patent: Mar. 12, 2019

(54) POLICY COMMUNICATION VIA CONTROL PLANE SIGNALING

(71) Applicant: QUALCOMM Incorporated, San Diego, CA (US)

(72) Inventors: Miguel Griot, La Jolla, CA (US); Stefano Faccin, San Ysidro, CA (US); Santosh Paul Abraham, San Diego, CA (US); Haris Zisimopoulos, London (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/877,241

(22) Filed: Jan. 22, 2018

(65) Prior Publication Data

US 2018/0270840 A1 Sep. 20, 2018

(30) Foreign Application Priority Data

Mar. 20, 2017 (GR) .............................. 20170100110

(51) Int. Cl.
*H04L 12/28* (2006.01)
*H04W 72/10* (2009.01)
(Continued)

(52) U.S. Cl.
CPC ........... *H04W 72/10* (2013.01); *H04L 5/0055* (2013.01); *H04L 41/0806* (2013.01);
(Continued)

(58) Field of Classification Search
USPC ................................. 370/252, 278, 329, 386
See application file for complete search history.

(56) References Cited

U.S. PATENT DOCUMENTS

2010/0054472 A1 3/2010 Barany et al.
2013/0083726 A1 4/2013 Jain et al.
(Continued)

FOREIGN PATENT DOCUMENTS

EP 3182654 A1 6/2017
WO WO-2016033811 A1 3/2016

OTHER PUBLICATIONS

3GPP, "3rd Generation Partnership Project; Technical Specification Group Core Network and Terminals; 3GPP System Architecture Evolution; CT WG1 Aspects (Release 8)," 3GPP D Technical Report, Dec. 18, 2008, 3GPP TR 24.801 V8.1.0, XP050910877, 3rd Generation Partnership Project, Sophia-Antipolis Cedex, France, 215 pages.
(Continued)

*Primary Examiner* — John Pezzlo
(74) *Attorney, Agent, or Firm* — Holland & Hart LLP

(57) ABSTRACT

Techniques are described herein to communicate policy information and policy information requests between user equipments (UEs) and a core network using control plane signaling. In some examples, non-access stratum (NAS) messages may be used to communicate policy information requests from a UE to the core network. Similarly, NAS messages may be used to communicate up-to-date policy information from the core network to the UE. In some examples, the core network may include number of functions to manage the communication of policy information with the UE. In some examples where the UE is roaming away from its home network, the core network may engage in additional signaling to pass policy information to the UE.

28 Claims, 18 Drawing Sheets

(51) Int. Cl.

| | | |
|---|---|---|
| *H04W 72/04* | (2009.01) | |
| *H04L 12/24* | (2006.01) | |
| *H04L 5/00* | (2006.01) | |
| *H04W 8/20* | (2009.01) | |
| *H04L 12/813* | (2013.01) | |
| *H04J 1/16* | (2006.01) | |
| *H04W 48/18* | (2009.01) | |

(52) U.S. Cl.
CPC .......... *H04L 41/0893* (2013.01); *H04L 47/20* (2013.01); *H04W 8/20* (2013.01); *H04W 72/0493* (2013.01); *H04W 48/18* (2013.01)

(56) References Cited

U.S. PATENT DOCUMENTS

| | | |
|---|---|---|
| 2014/0242970 A1 | 8/2014 | Yu et al. |
| 2015/0156705 A1* | 6/2015 | Punz ........................ H04W 8/20 370/328 |
| 2016/0248686 A1 | 8/2016 | Lee et al. |
| 2016/0278096 A1 | 9/2016 | Watfa et al. |
| 2016/0344635 A1 | 11/2016 | Lee et al. |
| 2017/0180259 A1* | 6/2017 | Yu ........................ H04L 41/0893 |
| 2017/0366960 A1* | 12/2017 | Kim ........................ H04W 8/08 |
| 2018/0227826 A1 | 8/2018 | Abraham et al. |

OTHER PUBLICATIONS

International Search Report and Written Opinion—PCT/US2018/019038—ISA/EPO—dated Apr. 20, 2018.

3GPP, "3rd Generation Partnership Project: Tectmical Specification Group Core Network and Terminals; Non-Access-Stratum (NAS) Protocol for Evolved Packet System (EPS); Stage 3; D (Release 13)," 3GPP Technical Specification, Mar. 18, 2016, 414 pages, 3GPP TS 24.301 V13.5.0, XP051088177, 3rd Generation Partnership Project, Sophia-Antipolis Valbonne, France.

3GPP TS 24.301 "3rd Generation Partnership Project; Technical Specification Group Core Network and Terminals; Non-Access-Stratum (NAS) protocol for Evolved Packet System (EPS); Stage 3 (Release 9)", Version 9.3.0, Jun. 15, 2010, Section 5.6.4 (p. 129), Sections 8.2.31 & 8.2.32 (pp. 200-201).

* cited by examiner

POLICY COMMUNICATION VIA CONTROL PLANE SIGNALING

CROSS REFERENCE

The present application for patent claims priority to Greek Provisional Patent Application No. 2017/0100110 by Griot, et al., entitled "Policy Communication Via Control Plane Signaling," filed Mar. 20, 2017, assigned to the assignee hereof.

INTRODUCTION

The following relates generally to wireless communication, and more specifically to policy communication via control plane signaling.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In some wireless communications systems, policies may be exchanged between the UE and the network. The policies may define a set of procedure used to establish and maintain communication links. Wireless communications systems include policies to reduce control signaling overhead. Some procedures occur frequently and the variables used in those procedure may remain fairly static for a communication link. By storing these policies at each entity in the wireless communications system, network signaling congestion and network overhead may be reduced.

SUMMARY

A method of wireless communication is described. The method may include receiving, by a user equipment (UE), a first non-access stratum (NAS) message over a control plane that includes policy information associated with the UE, identifying the policy information based at least in part on receiving the first NAS message, and updating the policy information stored by the UE based at least in part on the received policy information.

An apparatus for wireless communication is described. The apparatus may include means for receiving, by a user equipment (UE), a first non-access stratum (NAS) message over a control plane that includes policy information associated with the UE, means for identifying the policy information based at least in part on receiving the first NAS message, and means for updating the policy information stored by the UE based at least in part on the received policy information.

Another apparatus for wireless communication is described. The apparatus may include a processor, memory in electronic communication with the processor, and instructions stored in the memory. The instructions may be operable to cause the processor to receive, by a user equipment (UE), a first non-access stratum (NAS) message over a control plane that includes policy information associated with the UE, identify the policy information based at least in part on receiving the first NAS message, and update the policy information stored by the UE based at least in part on the received policy information.

A non-transitory computer-readable medium for wireless communication is described. The non-transitory computer-readable medium may include instructions operable to cause a processor to receive, by a user equipment (UE), a first non-access stratum (NAS) message over a control plane that includes policy information associated with the UE, identify the policy information based at least in part on receiving the first NAS message, and update the policy information stored by the UE based at least in part on the received policy information.

Some examples of the method, apparatus, and non-transitory computer-readable medium described above may further include processes, features, means, or instructions for prioritizing the received policy information based at least in part on which core network entity generated the received policy information, wherein updating the policy information may be based at least in part on the prioritizing.

Some examples of the method, apparatus, and non-transitory computer-readable medium described above may further include processes, features, means, or instructions for prioritizing a first subset of the policy information received from a visiting core network over a second subset of the policy information received from a home core network of the UE, wherein updating the policy information may be based at least in part the prioritizing.

Some examples of the method, apparatus, and non-transitory computer-readable medium described above may further include processes, features, means, or instructions for transmitting an acknowledgement NAS message over the control plane based at least in part on receiving the first NAS message.

Some examples of the method, apparatus, and non-transitory computer-readable medium described above may further include processes, features, means, or instructions for identifying a policy provisioning trigger indicating that UE may be to receive the policy information associated with the UE from a core network. Some examples of the method, apparatus, and non-transitory computer-readable medium described above may further include processes, features, means, or instructions for transmitting a second NAS message over the control plane requesting the policy information from the core network, wherein receiving the first NAS message may be based at least in part on transmitting the second NAS message.

Some examples of the method, apparatus, and non-transitory computer-readable medium described above may further include processes, features, means, or instructions for identifying an individual policy to be updated, the second NAS message including data indicating the individual policy, wherein identifying the policy provisioning trigger may be based at least in part on identifying the individual policy.

Some examples of the method, apparatus, and non-transitory computer-readable medium described above may further include processes, features, means, or instructions for identifying a location of the UE, wherein identifying the policy provisioning trigger may be based at least in part on identifying the location.

Some examples of the method, apparatus, and non-transitory computer-readable medium described above may further include processes, features, means, or instructions for receiving a permission message indicating a first subset of the policy information capable of being communicated over the control plane, wherein transmitting the second NAS message may be based at least in part on the first subset of the policy information.

In some examples of the method, apparatus, and non-transitory computer-readable medium described above, the second NAS message includes a request for the policy information exclusive of any specific policy information identifiers.

In some examples of the method, apparatus, and non-transitory computer-readable medium described above, the second NAS message may be one of a registration request message, a service request message, a NAS transport message, or a session management message.

In some examples of the method, apparatus, and non-transitory computer-readable medium described above, the first NAS message may be generated without the UE transmitting a policy request message.

A method of for wireless communication is described. The method may include identifying a policy provisioning trigger indicating that a user equipment (UE) is to receive policy information associated with the UE from a core network, identifying the policy information based at least in part on the policy provisioning trigger, and transmitting a first message via control plane signaling to the UE, the first message including the identified policy information.

An apparatus for wireless communication is described. The apparatus may include means for identifying a policy provisioning trigger indicating that a user equipment (UE) is to receive policy information associated with the UE from a core network, means for identifying the policy information based at least in part on the policy provisioning trigger, and means for transmitting a first message via control plane signaling to the UE, the first message including the identified policy information.

Another apparatus for wireless communication is described. The apparatus may include a processor, memory in electronic communication with the processor, and instructions stored in the memory. The instructions may be operable to cause the processor to identify a policy provisioning trigger indicating that a user equipment (UE) is to receive policy information associated with the UE from a core network, identify the policy information based at least in part on the policy provisioning trigger, and transmit a first message via control plane signaling to the UE, the first message including the identified policy information.

A non-transitory computer readable medium for wireless communication is described. The non-transitory computer-readable medium may include instructions operable to cause a processor to identify a policy provisioning trigger indicating that a user equipment (UE) is to receive policy information associated with the UE from a core network, identify the policy information based at least in part on the policy provisioning trigger, and transmit a first message via control plane signaling to the UE, the first message including the identified policy information.

Some examples of the method, apparatus, and non-transitory computer-readable medium described above may further include processes, features, means, or instructions for receiving a second message via control plane signaling from the UE, the second message requesting the policy information from the core network, wherein identifying the policy provisioning trigger may be based at least in part on receiving the second message.

Some examples of the method, apparatus, and non-transitory computer-readable medium described above may further include processes, features, means, or instructions for identifying a change in a policy, wherein identifying the policy provisioning trigger may be based at least in part on the change in the policy.

Some examples of the method, apparatus, and non-transitory computer-readable medium described above may further include processes, features, means, or instructions for identifying a change in a location of the UE, wherein identifying the policy provisioning trigger may be based at least in part on the change in the location.

Some examples of the method, apparatus, and non-transitory computer-readable medium described above may further include processes, features, means, or instructions for identifying that the UE may be roaming such that the UE may be connected to a visiting core network rather than a home core network.

Some examples of the method, apparatus, and non-transitory computer-readable medium described above may further include processes, features, means, or instructions for requesting, by a visiting core network entity, the policy information directly from a home policy management entity.

Some examples of the method, apparatus, and non-transitory computer-readable medium described above may further include processes, features, means, or instructions for requesting, by a first visiting core network entity, the policy information from a visiting policy management entity associated with the UE.

Some examples of the method, apparatus, and non-transitory computer-readable medium described above may further include processes, features, means, or instructions for requesting, by the visiting policy management entity, policy information from a home policy management entity associated with the UE.

Some examples of the method, apparatus, and non-transitory computer-readable medium described above may further include processes, features, means, or instructions for combining policy information from the home policy management entity and policy information from the visiting policy management entity based at least in part on a conflict resolution procedure, wherein the first message includes the combined policy information.

Some examples of the method, apparatus, and non-transitory computer-readable medium described above may further include processes, features, means, or instructions for determining, by the visiting policy management entity, whether to request policy information from a home policy management entity associated with the UE.

Some examples of the method, apparatus, and non-transitory computer-readable medium described above may further include processes, features, means, or instructions for receiving an acknowledgement message via control plane signaling from the UE based at least in part on transmitting the first message.

Some examples of the method, apparatus, and non-transitory computer-readable medium described above may further include processes, features, means, or instructions for identifying what policy information the UE may be permitted to receive over the control plane, wherein transmitting the first message may be based at least in part on the identifying.

Some examples of the method, apparatus, and non-transitory computer-readable medium described above may further include processes, features, means, or instructions for determining whether the UE may be in a connected mode or an idle mode, wherein transmitting the first message may be based at least in part on the determining.

In some examples of the method, apparatus, and non-transitory computer-readable medium described above, the first control message may be a non-access stratum (NAS) message.

A method of for wireless communication is described. The method may include receiving, by a user equipment (UE), a non-access stratum (NAS) message over a control plane that includes policy information associated with the UE and updating policy information stored by the UE based at least in part on the received policy information.

An apparatus for wireless communication is described. The apparatus may include means for receiving, by a user equipment (UE), a non-access stratum (NAS) message over a control plane that includes policy information associated with the UE and means for updating policy information stored by the UE based at least in part on the received policy information.

Another apparatus for wireless communication is described. The apparatus may include a processor, memory in electronic communication with the processor, and instructions stored in the memory. The instructions may be operable to cause the processor to receive, by a user equipment (UE), a non-access stratum (NAS) message over a control plane that includes policy information associated with the UE and update policy information stored by the UE based at least in part on the received policy information.

A non-transitory computer readable medium for wireless communication is described. The non-transitory computer-readable medium may include instructions operable to cause a processor to receive, by a user equipment (UE), a non-access stratum (NAS) message over a control plane that includes policy information associated with the UE and update policy information stored by the UE based at least in part on the received policy information.

Some examples of the method, apparatus, and non-transitory computer-readable medium described above may further include processes, features, means, or instructions for prioritizing the received policy information based at least in part on which core network entity generated the received policy information, wherein updating the policy information may be based at least in part on the prioritizing.

Some examples of the method, apparatus, and non-transitory computer-readable medium described above may further include processes, features, means, or instructions for prioritizing a first subset of the policy information received from a visiting core network over a second subset of the policy information received from a home core network of the UE, wherein updating the policy information may be based at least in part the prioritizing.

Some examples of the method, apparatus, and non-transitory computer-readable medium described above may further include processes, features, means, or instructions for transmitting an acknowledgement NAS message over the control plane based at least in part on receiving the NAS message.

In some examples of the method, apparatus, and non-transitory computer-readable medium described above, the NAS message may be generated without the UE transmitting a policy request message.

A method of for wireless communication is described. The method may include identifying a policy provisioning trigger indicating that a user equipment (UE) is to receive policy information associated with the UE from a core network, transmitting a first non-access stratum (NAS) message over a control plane requesting the policy information from the core network, and receiving a second NAS message over the control plane that includes the policy information, the second NAS message being based at least in part on the first NAS message.

An apparatus for wireless communication is described. The apparatus may include means for identifying a policy provisioning trigger indicating that a user equipment (UE) is to receive policy information associated with the UE from a core network, means for transmitting a first non-access stratum (NAS) message over a control plane requesting the policy information from the core network, and means for receiving a second NAS message over the control plane that includes the policy information, the second NAS message being based at least in part on the first NAS message.

Another apparatus for wireless communication is described. The apparatus may include a processor, memory in electronic communication with the processor, and instructions stored in the memory. The instructions may be operable to cause the processor to identify a policy provisioning trigger indicating that a user equipment (UE) is to receive policy information associated with the UE from a core network, transmit a first non-access stratum (NAS) message over a control plane requesting the policy information from the core network, and receive a second NAS message over the control plane that includes the policy information, the second NAS message being based at least in part on the first NAS message.

A non-transitory computer readable medium for wireless communication is described. The non-transitory computer-readable medium may include instructions operable to cause a processor to identify a policy provisioning trigger indicating that a user equipment (UE) is to receive policy information associated with the UE from a core network, transmit a first non-access stratum (NAS) message over a control plane requesting the policy information from the core network, and receive a second NAS message over the control plane that includes the policy information, the second NAS message being based at least in part on the first NAS message.

Some examples of the method, apparatus, and non-transitory computer-readable medium described above may further include processes, features, means, or instructions for updating policy information stored by the UE based at least in part on the received policy information.

Some examples of the method, apparatus, and non-transitory computer-readable medium described above may further include processes, features, means, or instructions for prioritizing a first subset of the policy information received from a visiting core network over a second subset of the policy information received from a home core network of the UE.

Some examples of the method, apparatus, and non-transitory computer-readable medium described above may further include processes, features, means, or instructions for transmitting an acknowledgement NAS message over the control plane based at least in part on receiving the second NAS message.

Some examples of the method, apparatus, and non-transitory computer-readable medium described above may further include processes, features, means, or instructions for identifying an individual policy to be updated, the first NAS message including data indicating the individual policy, wherein identifying the policy provisioning trigger may be based at least in part on identifying the individual policy.

Some examples of the method, apparatus, and non-transitory computer-readable medium described above may further include processes, features, means, or instructions for identifying a location of the UE, wherein identifying the policy provisioning trigger may be based at least in part on identifying the location.

Some examples of the method, apparatus, and non-transitory computer-readable medium described above may further include processes, features, means, or instructions for receiving a permission message indicating a first subset of the policy information capable of being communicated over the control plane, wherein transmitting the first NAS message may be based at least in part on the first subset of policy information.

In some examples of the method, apparatus, and non-transitory computer-readable medium described above, the first NAS message includes a request for the policy information exclusive of any specific policy information identifiers.

In some examples of the method, apparatus, and non-transitory computer-readable medium described above, the first NAS message may be one of a registration request message, a service request message, a NAS transport message, or a session management message.

DETAILED DESCRIPTION

To establish and/or maintain communications links between the network and UEs, a wireless communications system may define sets of procedures to be implemented by the network entities. Some of these procedures related to the quality of the communication link may be fairly static and may not have as many changing variables. As such, efficiencies in signaling may be realized by storing some of these procedures on each network entity. In this manner, control signaling between entities may be reduced when performing these procedures. These procedures stored locally on entities in the network may be grouped into policies. In some examples, however, the policies stored by some network entities (e.g., UEs) may need to be updated due to changing network conditions or changes in the policies themselves.

Techniques are described herein to communicate policy information and policy information requests between UEs and a core network using control plane signaling. In some examples, non-access stratum (NAS) messages may be used to communicate policy information requests from a UE to the core network. Similarly, NAS messages may be used to communicate up-to-date policy information from the core network to the UE. In some examples, the core network may include number of functions to manage the communication of policy information with the UE. In some examples where the UE is roaming away from its home network, the core network may engage in additional signaling to pass policy information to the UE.

Aspects of the disclosure are initially described in the context of a wireless communications system. Aspects of the disclosure are illustrated by and described with reference to communication schemes. Aspects of the disclosure are further illustrated by and described with reference to apparatus diagrams, system diagrams, and flowcharts that relate to policy communication via control plane signaling.

Figure 1:
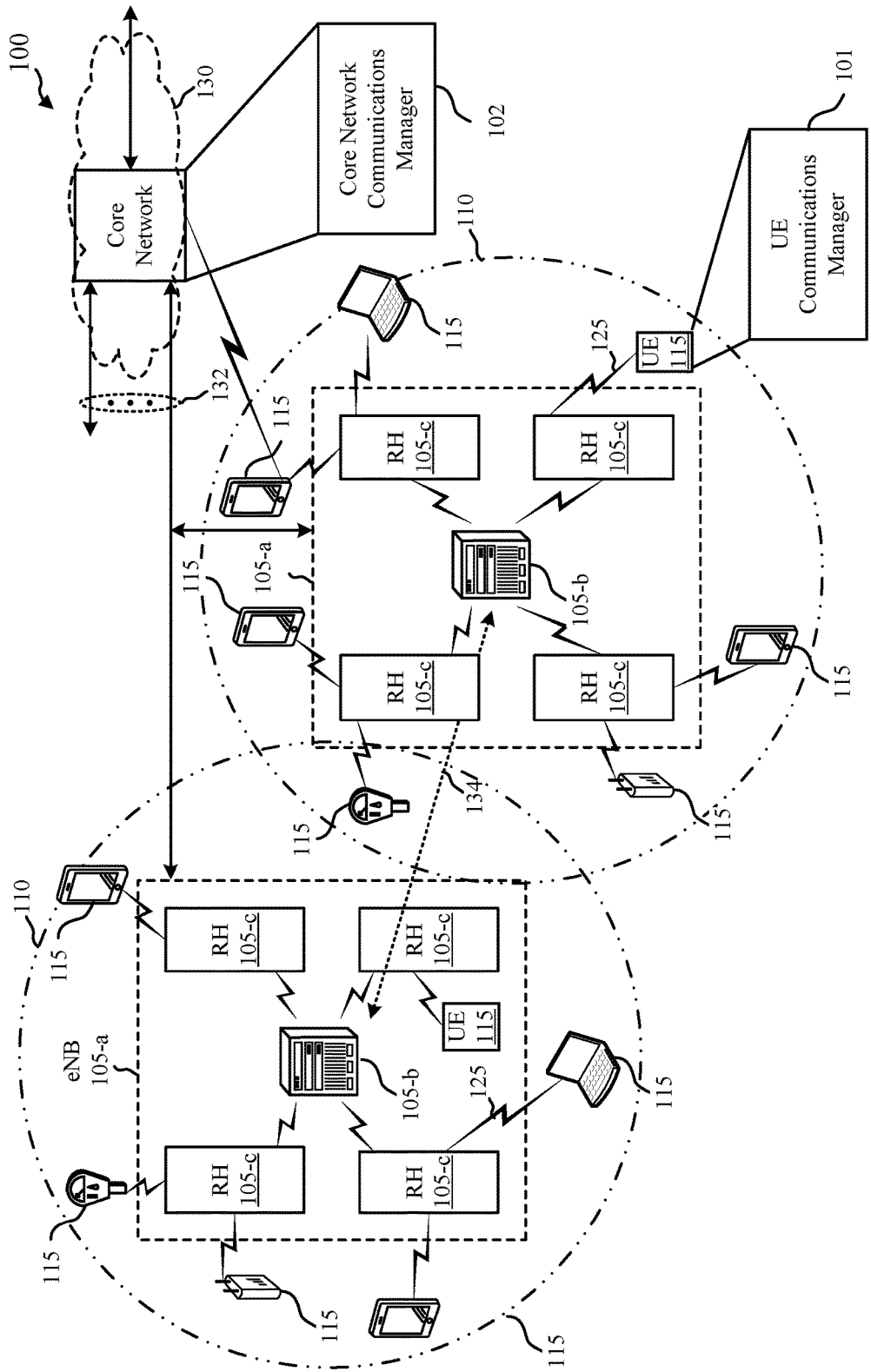
FIG. 1 illustrates an example of a system for wireless communication that supports policy communication via control plane signaling in accordance with one or more aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices. Techniques are described herein for communicating policy information between a UE 115 and the core network 130 using NAS messages and/or control plane signaling.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) or gNodeBs (gNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices, such as base station 105-a may include subcomponents such as an access network entity 105-b, which may be an example of an access node controller (ANC). Each access network entity 105-b may communicate with a number of UEs 115 through a number of other access network transmission entities 105-c, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

UEs 115 may include a UE communications manager 101, which may communicate policy requests and policy information with a first core network entity using NAS messages over a control plane. The core network 130 may include an access and mobility management function (AMF) 120. In some examples, the first core network entity that communicates policy requests and policy information with the UEs 115 using NAS messages over the control plane. The AMF 120 may be implemented by any core network entities. In some examples, the functions of the AMF 120 may be performed by a plurality of core network entities. The AMF 120 include a core network communications manager 102, which may coordinate policy related communications with the UEs 115. In some examples, the core network communications manager 102 may communicate policy requests and/or policy information with other core network entities, such as a policy control function (PCF).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 115) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and a network device 105-*c*, network device 105-*b*, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each orthogonal frequency division multiplexing (OFDM) symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplexing (FDD) and time division duplexing (TDD) component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless system 100 may utilize both licensed and unlicensed radio frequency spectrum bands. For example, wireless system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD, or a combination of both.

In the wireless communications system 100 (e.g., a 5G system), the functions of the core network 130 may be virtualized to allow for a more flexible architecture. Specifically, a core network may include several entities (or functions) such as AMFs, PCFs, etc. implemented in software. In addition, in the wireless communications system (e.g., 5G system), a UE 115 may be in a connected mode with a base station without an active data connection. Accordingly, the UE may not be able to communicate with some virtualized entities (or functions), and this may result in reduced throughput in a wireless communications system. In some examples, the UE 115 may be capable communicating at least some NAS messages over the control plane without an active data session (e.g., a protocol data unit (PDU) session).

The wireless communications system 100 may support techniques for efficient communication between a UE 115 and different entities (or functions) of a core network 130. Specifically, UE 115 may interact with a single entity (or function) of a core network 130 (e.g., an AMF 120), and messages intended for other entities (or functions) may be routed appropriately by this entity. That is, as one example, for uplink communication, a UE may transmit a NAS message to AMF 120 requesting policy information from another entity of the core network 130. The AMF 120 may transmit (or route) the policy request or policy information to the appropriate entity (e.g., PCF). Similarly, for downlink communication, other entities (or functions) (e.g., PCF) may transmit the policy request or policy information to the AMF 120. The AMF 120 may transmit (or route) the policy request or policy information to a UE 115.

Figure 2:
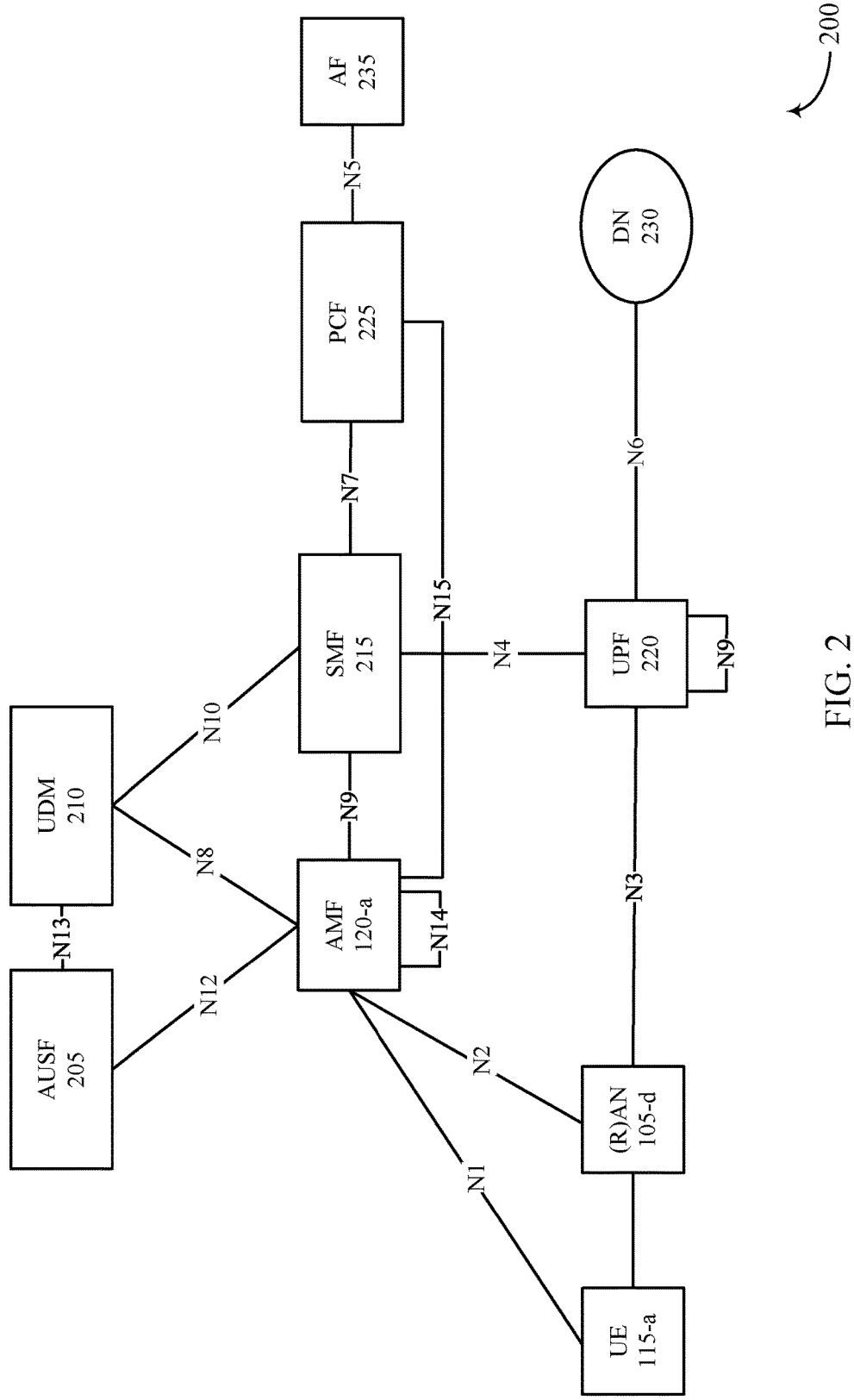
FIG. 2 illustrates an example of a wireless communications system architecture that supports policy communication via control plane signaling in accordance with one or more aspects of the present disclosure.

FIG. 2 illustrates an example of a wireless communications system architecture 200 that supports policy communication via control plane signaling in accordance with various aspects of the present disclosure. Wireless communications system architecture 200 may include UE 115-*a*, (R)AN 105-*d*, and AMF 120-*a*, which may be examples of the corresponding devices described with reference to FIG. 1. Wireless communications system architecture 200 may also include one or more authentication server functions (AUSFs) 205, unified data management (UDM) entities 210, SMFs 215, user plane functions (UPFs) 220 (e.g., in communication with a data network (DN) 230), policy control functions (PCFs) 230, and authorization functions (AFs) 235. In addition, wireless communications system architecture 200 may include other functions or entities not displayed within the figure, or may not include one or more of the functions or entities shown. Various interfaces may be established between the different entities in the wireless communications system architecture 200. The interfaces may be denoted by N numbers, and sometimes may be called communication links. Such interfaces may refer to a communication link between network entities, a packet scheme, data permissions allowed between the entities, other features of the communication links, or combinations thereof.

The AUSF 205 may provide authentication services for UE 115-*a*. For example, AUSF 205 may initiate authentication of UE 115-*a* and provide NAS security functions for a UE 115-*a* based on a request from AMF 120-*a* over communication link N12. In some cases, the authentication and security function may be based on information stored in an entity 210 (e.g., a UDM). Entity 210 (e.g., a UDM) may support an authentication credential repository and processing function (ARPF) that stores the long-term security credentials used in authentication. The AUSF 205 may retrieve information from the entity 210 (e.g., UDM) over communication link N13.

The SMF 215 may provide session management services for UE 115-*a*. Specifically, SMF 215 may establish, modify, and release sessions (or bearers) for communication between UE 115-*a* and DN 230. For example, SMF 215 may maintain a tunnel for communication between UPF 220 and an access network (AN) node. In addition, SMF 215 may allocate and manage IP addresses for UE 115-*a*, select and control user plane functions, configure traffic steering at UPF 220 to route traffic to proper destinations, terminate SM parts of NAS messages, provide roaming functionality, etc.

The UPF 220 may include functionality for serving as the point of interconnect to DN 230 for an external PDU session. In some cases, UPF 220 may be the anchor point for intra-RAT and inter-RAT mobility. UPF 220 may route and forward packets to and from DN 230, inspect packets and enforce policy rules in the user plane, report traffic usage, handle quality of service (QoS) for user plane packets, verify uplink traffic, etc. The PCF 225 may support unified policy framework to govern the behavior of the network. Specifically, PCF 225 may provide policy rules to control plane functions to enforce them. In some cases, PCF 225 may retrieve subscription information from a subscription repository at entity 210 (e.g., a UDM). AF 235 may support services for authorizing a UE 115-*a* for access to a network.

The PCF 225 may manage policies for the various UEs 115-*a* of the wireless communications system architecture 200. The core network 130 may communicate policies to UEs 115-*a* in the wireless communications system architecture 200 to improve the quality of communication links and improve the quality of service. The PCF 225 may interact with a number of other functions (e.g., AMF 120-*a*, SMF 215) in the wireless communications system architecture 200.

The AMF 120-*a* may be configured to provide policy information from the PCF 225-*a* to the UE 115-*a*. The PCF 225-*a* may include such policy information 345 stored on memory or the like. The policy information 345 may be communicated between the PCF 225-*a* and the AMF 120-*a* via a network interface 350 or a communication link. In some examples, the network interface 350 may be an Ni interface. The policy information 345 may include an access network discovery and selection policy, route selection policies, an SSC mode selection policy, a network slice selection policy, a DNN selection policy, a non-seamless offload policy, other policies or combinations thereof. The access network discovery and selection policy may be used by the UE 115-*a* for selecting non-3GPP accesses and for deciding how to route traffic between the selected 3GPP and non-3GPP accesses. The route selection policies may be used by the UE 115-*a* to determine how to route outgoing traffic. Traffic can be routed to an established PDU session, can be offloaded to non-3GPP access outside a PDU session, or can trigger the establishment of a new PDU session. In some examples, the route selection policies may include the SSC mode selection policy, the network slice selection policy, the DNN selection policy, and/or the non-seamless offload policy.

The SSC Mode Selection Policy (SSCMSP) may be used by the UE 115-*a* to associate UE applications with SSC modes and to determine the PDU session which this traffic should be routed to. It is also used to determine when a new PDU session should be requested with a new SSC mode. The network slice selection policy (NSSP) may be used by the UE 115-*a* to associate UE applications with SM-NSSAIs and to determine the PDU session which this traffic should be routed to. It is also used to determine when a new PDU session should be requested with a new SM-NSSAI. The DNN Selection Policy may be used by the UE 115-*a* to associate UE traffic with one or more DNNs and to determine the PDU session which this traffic should be routed to. It may also be used to determine when a PDU session should be requested to a new DNN. It may also indicate the access type (3GPP or non-3GPP) on which a PDU session to a certain DNN should be requested. The non-seamless offload policy may be used by the UE 115-*a* to determine which traffic should be non-seamlessly offloaded to non-3GPP access (e.g., outside of a PDU session).

In some wireless systems (e.g., a 5G wireless system), a UE 115-*a* may access a DN 230 to exchange data packets using a PDU session. The PDU session may provide a PDU connectivity service, which may support the transmission of one or more PDUs between UE 115-*a* and the DN 230. An association between UE 115-*a* and the DN 230 in a PDU session may use internet protocol (IP) or Ethernet, or the association may be unstructured. In some cases, DN 230 may be an example of a local DN, central DN, public land mobile networks (PLMNs), etc.

As illustrated the different functions of a core network may be virtualized to support a more flexible architecture. That is, the different functions described above may be implemented in software. In such cases, a UE 115-*a* may communicate with DN 230, SMF 215, PCF 225, etc. via the N3 communication link between RAN 105-*d* and UPF 220. The N3 communication link may be referred to as a data connection for the UE 115-*a*. But in some cases, UE 115-*a* may not have information to transmit to any of these entities (or functions) or UE 115-*a* may have limited information to transmit, and it may be inefficient to sustain an active data connection. Accordingly, some wireless communication systems may allow a UE 115-*a* to be in a connected mode without an active data connection. But without an active data connection, the UE may not be able to transmit the limited amounts of data, and this may result in reduced throughput in a wireless communications system.

Wireless communications system architecture 200 may support efficient techniques for allowing a UE 115-*a* to communicate with entities (or functions) of a core network 130 without an active data connection. Specifically, UE 115-*a* may transmit messages intended for other entities (or functions) to AMF 120-*a*, and such messages may be routed appropriately by the AMF 120. For example, for policy messages, UE 115-*a* may transmit a NAS transport message to the AMF 120-*a* via the Ni interface. The AMF 120-*a* may transmit (or route) the message to PCF 225 via the N15 interface. In some examples, the AMF 120-*a* may alter or modify the policy message before transmitting. The procedure may also be reversed. The PCF 225 may transmit policy information intended for the UE 115-*a* to the AMF 120-*a* via the N15 interface. The AMF 120-*a* may transmit or route the policy information to the UE 115-*a* via the Ni interface. The NAS transport message may include a routing indicator and a header that indicates the type of payload included in the message, and AMF 120-*a* may use this information to route the message appropriately. Accordingly, UE 115-*a* may be able to transmit and receive information to and from entities (or functions) of a core network without having to maintain an active data session.

Figure 3:
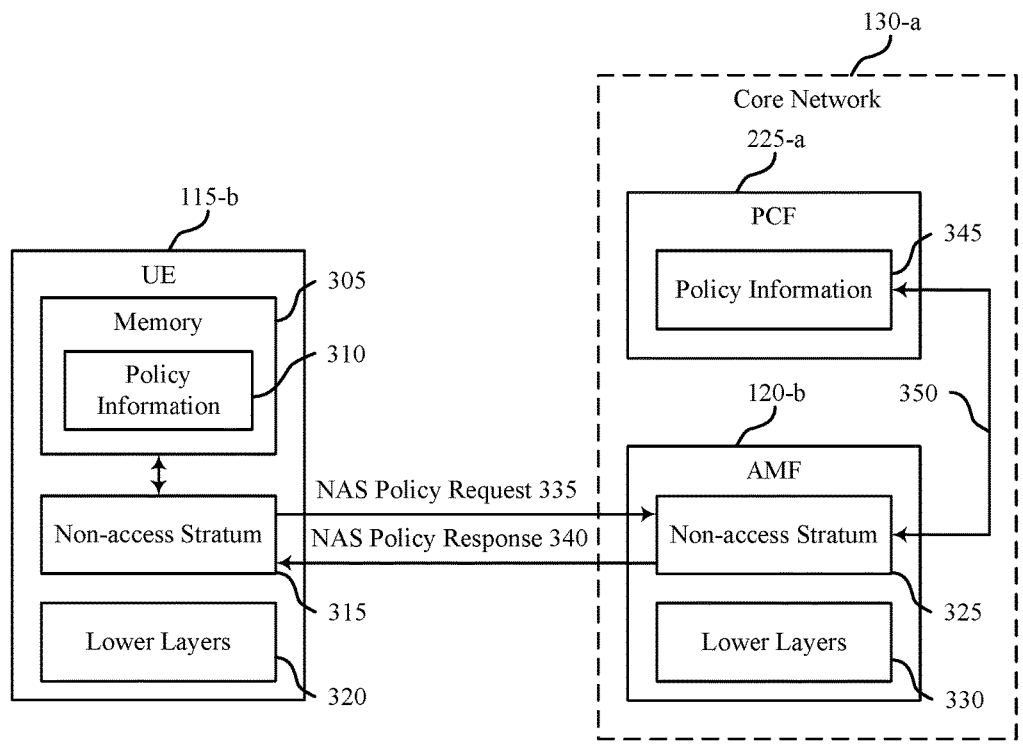
FIG. 3 illustrates an example of a wireless communications system that supports policy communication via control plane signaling in accordance with one or more aspects of the present disclosure.

FIG. 3 illustrates an example of a wireless communications system 300 that supports policy communication via control plane signaling in accordance with various aspects of the present disclosure. The wireless communications system 300 may use NAS messages 335, 340 to communicate policy information between the UE 115-*b* and the core network 130-*a*.

The UE 115-*b* may be an example of the UEs described with reference to FIGS. 1 and 2. The UE 115-*b* may include a memory 305 to store data. Policy information 310 may be stored by the UE 115-*b* in the memory 305. In some examples, the policy information 310 is associated with the UE 115-*b*. In some examples, the policy information 310 is associated with the communication link established between the UE 115-*b* and the core network 130-*b*. The policy information 310 may include any of the policies described with reference to FIG. 2.

The UE 115-*b* may be configured to communicate using a NAS layer 315 and/or one or more lower layers 320. The lower layers 320 may include any number of layers in a radio access technology. For example, the lower layers 320 may include a physical layer, medium access layer, radio link control layer, packet data convergence control layer, or combinations thereof. The NAS layer 315 may be used to manage the establishment of communication sessions and for maintain continuous communication links between the UE 115-*b* and the core network 130-*b* as the UE 115-*b* moves through the coverage area of the wireless network. In some examples, the UE 115-*b* and the core network 130-*b* may be capable of exchanging NAS messages without a PDU session being established between the entities.

To facilitate the quality of communication links, a radio access technology may define one or more policies for communicating between entities. A policy may define a set of common procedures to be used by entities of the network. The policies may be shared with different entities so that the procedures do not have be communicated across congested wireless links as frequently. In some examples, however, the policies stored by some network entities (e.g., UE 115-b) may need to be updated due to changing network conditions or changes in the policies themselves.

As described in more detail herein, policy information may be exchanged between the UE 115-b and the core network 130-b using control plane signaling. In some examples, NAS messages may be used to communicate policy update requests from the UE 115-b to the core network 130-b or to communicate up-to-date policy information from the core network 130-b to the UE 115-b. For example, the UE 115-b may transmit a NAS policy request message 335 using control plane signaling to the core network 130-b. The core network 130-b may transmit a NAS policy information message 340 using control plane signaling to the UE 115-b.

The core network 130-b may include an AMF 120-b and a PCF 225-a. The AMF 120-b may include a non-access stratum layer 325 similar to the NAS layer 315 and lower layers 330 similar to the lower layers 320. In some examples, the core network entity that communicates with the UE 115-b is the AMF 120-b. In some examples, the messages 335, 340 may be communicated using the Ni interface.

The PCF 225-a may be the core network entity configured to store and manage the policies and policy information related to the core network 130-b. As such, the AMF 120-b may communicate policy information and/or policy update requests with the PCF 225-a. In some examples, the AMF 120-b and the PCF 225-a communicate using the N15 interface.

To establish and maintain the quality of communication links in a wireless communication network, the UE 115-b and the core network 130-b may exchange policy information. For example, policy messages (e.g., NSSAI, SSCMP) information may be carried as a payload in NAS transport message. In some instances, policy information may be carried in an initial NAS message.

When sending a registration/mobility management (RM) message to the core network 130-b, the UE 115-b may include a request for policy provisioning and may receive from the core network 130-b the requested policy. The request for policy provisioning may be included in a registration request message or a service request message. It may also be piggybacked with an SM message or other messages using NAS transport. When a policy provisioning message is received at the AMF 120-b over the Ni interface, the AMF 120-b may perform the deciphering and integrity check and may route the message to the PCF 225-a.

For messages that are from the PCF 225-a to the UE 115-b, the a function, sometimes referred to as the AMPEF (in the PCF 225-a) may query the status of the UE 115-b through the N15 interface, if the AMF 120-b returns UE state as connected, the function may send the message to the AMF 120-b indicating that the message is to be sent to the UE 115-b. The AMF 120-b may encapsulate the message in a generic NAS transport payload and may send it to the UE 115-b. If the UE 115-b is in an idle mode, the AMF 120-b may send an idle mode indication to the PCF 225-a and may store an indication that there is a AMPEF message for the UE 115-a. When the UE 115-b switches to a connected mode, the AMF 120-b may send the function a UE connected indication and the PCF 225-a may send the AMF 120-b the message to be sent to the UE 115-b.

In some examples, policy messages from the PCF 225-a to the UE 115-b may be triggered as a result of receiving policy provisioning request messages from the UE 115-b, updates made to the policies associated with the UE 115-b, during a registration procedure (e.g., the PCF 225-a may receive UE context establishment request), or combinations thereof.

In some examples of roaming where the UE 115-b is not connected to a home core network 130-a, a visited PCF (vPCF) may forward any policy provisioning requests from the UE 115-b to a home PCF (hPCF) through the N7r interface and may retrieve the response from the hPCF to forward to the UE 115-b. In some examples, these communications may use the N15r interface. The hPCF may also communicate any policy changes to the UE via the vPCF through the N7r interface or the N15r interface.

In other examples of roaming, the AMF in the VPLMN may have routing information for the hPCF. The AMF may route the UE request to the hPCF directly, and the hPCF may download the UE policies via the AMF in the VPLMN directly.

Figure 4:
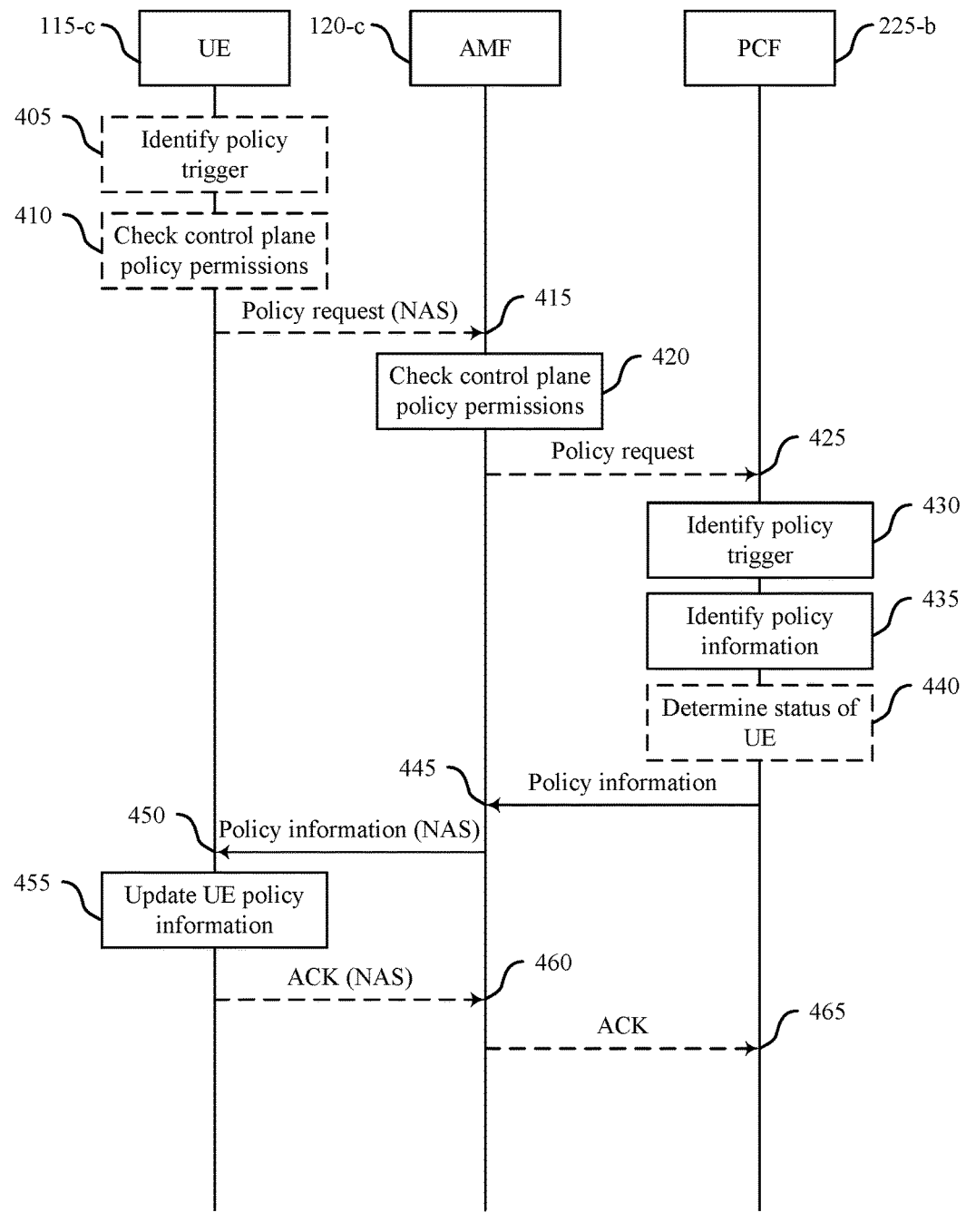
FIG. 4 illustrates an example of a communication scheme that supports policy communication via control plane signaling in accordance with one or more aspects of the present disclosure.

FIG. 4 illustrates an example of a communication scheme 400 that supports policy communication via control plane signaling in accordance with various aspects of the present disclosure. The communication scheme 400 illustrates a policy provisioning procedure in a non-roaming scenario. The communication scheme 400 illustrates and describes functions and communications performed by a UE 115-c, an AMF 120-c, and a PCF 225-b. The AMF 120-c and the PCF 225-b may be examples of entities in the core network 130. These entities may be examples of other entities described with reference to FIGS. 1-3.

At block 405, the UE 115-c may identify a policy provisioning trigger. A policy provisioning trigger may include any event that causes the UE 115-c to need new or updated policy information. In some examples, a policy provisioning trigger may be a change in network conditions, a change in a location of the UE 115-c, a change in the underlying policy itself, at the establishment of a communication link, or combinations thereof.

In some cases, as the UE 115-c moves throughout a coverage area of the wireless network, certain policies may need to be updated. The UE 115-c may determine location data associated with its location and transmit that location data to the core network 130 (as represented by AMF 120-c).

In some cases, the policy provisioning trigger may be based on changes in network conditions. For example, the UE 115-c may be handed over to a different cell, communication link, base station, or radio head. Such changes in the communication link may mean that certain policies may need to be updated. Other changes in network conditions may include inter-radio access technology (RAT) handoffs, intra-RAT handoffs, radio link failure (RLF), poor communication link quality, or combinations thereof.

In some cases, the policy provisioning trigger may be based on establishing a communication link. Before establishing a communication link, it is likely that the UE 115-c does not have stored all of the policies for that particular portion of the wireless network. As such, as part of connecting to the wireless network (e.g., through a radio head or through a base station), the UE 115-c may request the policies associated with the UE 115-c and that portion of the wireless network.

In some examples, the policy provisioning trigger may be based on changes in the underlying policy. Because the UE 115-c typically does not maintain the policies, the UE 115-c may identify this trigger based on communications received from the core network 130, in some examples.

In some examples, the UE 115-c may identify specific policies that should be updated. As such, when the UE 115-c sends a policy update request, the UE 115-*c* may include information identifying specific policies that should be updated.

In some examples, the message 415 may include an indication that the UE 115-*c* needs to receive updated policy information. In some examples, the message 415 may include an indication of one or more specific policies, policy types, or other policy information to be updated or retrieved.

At block 410, the UE 115-*c* may check the permissions related to communicating policies via control plane signaling. Not all policies may be allowed to be communicated with the control plane using NAS messages. As such, in some examples, the UE 115-*c* may consult a permissions list or other data structure to determine which policies may be updated using NAS messaging. In some examples, this operation is performed by a network entity. In some examples, the UE 115-*c* may receive a message from the core network 130 informing the UE 115-*c* which policies may be communicated via control plane signaling.

In some examples, the core network 130 may include a mechanism to deliver to the UE 115-*c*, during an RM procedure, an indication of the type of policy retrieval the UE 115-*c* is allowed to perform. For example, the indication may indicate which types of policies the UE can request using control plane solution. The indication may also indicate how the UE 115-*c* may retrieve policies using a user plane solution. The indication may provide information to the UE 115-*c* to determine the PCF address to retrieve the policy. In some instances, the PCF address is needed roaming scenarios for the UE 115-*c* to contact the vPCF, including delivering one or more of a DNN to be used to retrieve the policy, and a logical name for addressing the PCF (e.g., a uniform resource locator (URL) that the UE may translate into an IP address using DNS).

The UE 115-*c* may transmit a policy information request message 415 via an NAS message and control plane signaling. The policy information request message 415 may be generated and transmitted based on identifying that the trigger event occurred. In some examples, the policy information request message 415 may be generated and transmitted based on the UE 115-*c* determining that the policies to be updated are on the control plane signaling permissions list or other data structure.

The policy information request message 415 may include information identifying the UE 115-*c* and/or information identifying specific policies to be updated. In some cases, the policy information request message 415 may not include any identifiers of specific policies. Rather, in these cases, the policy information request message 415 may simply request new policy information. As such, the policy information request message 415 may be exclusive of any policy identifiers. The policy information request message 415 may include a UE identifier, a policy identifier, an indication that a network condition has changed, information about the changed network condition, an indication that a location of the UE 115-*c* has changed, information about the changed location, other information, or combination thereof.

The UE 115-*c* may transmit the policy information request message 415 to the AMF 120-*c* of the core network. In some examples, the policy information request message 415 may be communicated using an Ni interface. The policy information request message 415 may be an NAS message, in some examples. In some instances, (e.g., if the policy request is a standalone request), the policy update request may be transmitted over a NAS transport message. The policy information request message 415 may also be sent as part of a registration request or a service request message.

The policy information request message 415 may include a request with no further information, or it may contain specific policies or policy types that the UE 115-*c* is requesting. The UE 115-*c* may have been previously configured (via USIM/via NAS signaling or other means) to know which policies can be requested via NAS.

The AMF 120-*c* may receive the policy information request message 415, perform some processing, and transmit a policy information request message 425 to the proper network entity (e.g., PCF 225-*b*). Examples of processing performed by the AMF 120-*c* may include performing a deciphering and integrity check. In some examples, the AMF 120-*c* may append other data to the message 415 as part of generating the message 425, such as timestamps, UE identifiers, or other data. In some examples, the policy information request message 425 may be communicated via an N15 interface. In some examples, the message 425 is the same as the message 415. In some examples, the message 425 is different from the message 415. Because the message 425 is between core network entities, the message 425 may not be a NAS message, in some examples.

In some instances, at block 420, the AMF 120-*c* may determine if the UE 115-*c* is allowed to request or receive certain policies. In some examples, the AMF 120-*c* may determine whether the UE 115-*c* is allowed to communicate certain policies using NAS messages. As such, the AMF 120-*c* may determine two-levels of permissions. First, whether the UE 115-*c* is entitled to certain policy information at all. Second, how the policy information is allowed to be communicated, via the control plane (NAS messaging) or the user plane. Some policy information may not be permitted to be communicated using NAS messages and control plane signaling. The determination may be based on a permission list maintained by the core network 130. In some examples, the functions of block 420 may be performed by a different core network entity (e.g., PCF 225-*b*).

In some examples, the policy provisioning procedure may be initiated by the core network 130 and not the UE 115-*c*. In such examples, the functions of blocks 405, 410, 415 425, may not be performed as a part of a policy provisioning procedure. As such, such blocks may be optional in a core network initiated policy provisioning procedure. In some examples, any core network entity (e.g., AMF 120-*c*, PCF 225-*b*) may initiate a policy provisioning procedure. While many of the functions are described as being performed by the PCF 225-*b*, the functions may also be performed by the AMF 120-*c* or another core network entity. Changes in signaling that result from another core network entity performing some of the functions described herein is within the scope of this disclosure.

At block 430, a core network entity, and in some examples the PCF 225-*b*, may identify a policy provisioning trigger. The policy provisioning trigger may be similar to the policy provisioning triggers described with reference to block 405. Triggers for the core network may include receiving a policy information request message 415, 425 from the UE 115-*c*, a change in network conditions, a change in a location of the UE 115-*c*, a change in the underlying policy itself, at the establishment of a communication link, or combinations thereof.

In some cases, trigger event may be receiving the request messages 415, 425 from the UE 115-*c*. The PCF 225-*b* or other core network entity may determine information included in the request messages 415, 425. Sometimes the trigger event may be based on information included in the message 415, 425, such as location data or change of network data.

In some cases, the trigger event may be based on the policy changing. In some examples, the core network 130 may change one of the policies for a variety of reasons. The PCF 225-b, upon detecting a change in a policy, may identify that a policy provisioning trigger has occurred. In some examples, the functions of block 430 may be performed by a different core network entity (e.g., AMF 120-c).

In some example, the network policy provisioning in the PCF 225-b may be triggered by the UE 115-c sending a registration/mobility management (e.g., NAS) message to the network, the UE 115-c may include a request for policy provisioning and may receive from the network the requested policy. In some examples, the PCF 225-b includes a mechanism to trigger, upon successful registration of the UE 115-c (e.g., UE context establishment request from the AMF 120-c) to trigger the network initiated policy delivery.

At block 435, the PCF 225-b may identify which policies or policy information to provide to the UE 115-c. The determination of the PCF 225-b may be based on the contents of the message 415, 425, a local configuration, a location of the UE 115-c, a change in the network configuration, other information available to the PCF 225-b, or combinations thereof. In some examples, the PCF 225-b may determine what policy information cannot be sent via NAS messaging and not include that policy information. In some examples, the PCF 225-b may determine what policy information to provide to the UE 115-c based on what policies or policy information was updated by the core network 130. In some examples, the functions of block 430 may be performed by a different core network entity (e.g., AMF 120-c).

The PCF 225-b, may generate a policy information message 445 based on the identified policy information to provide the UE 115-c. The policy information message 445 may include policy information, requested policy information, UE identifiers, or other data. The policy information message 445 may be communicated using the N15 interface.

At block 440, the PCF 225-b may optionally determine a status of the UE 115-c. The PCF 225-b may query the AMF 120-c about a status of the UE 115-c. In some examples, the query may be through the N15 interface. The PCF 225-b may transmit the policy information to the AMF 120-c in with different information depending on the state of the UE 115-c. If the AMF 120-c returns that the UE 115-c is in a connected state, the PCF 225-b may transmit a policy information message 445 to the AMF 120-c indicating that the policy information message 445 is to be sent to the UE 115-c. The AMF 120-c may encapsulate the policy information message 445 in a generic NAS transport payload and sends the policy information message 450 to the UE 115-c. If the UE 115-c is in idle mode, the AMF 120-c may send an idle mode indication to the PCF 225-b and store an indication that there is a policy information message 445 waiting to be transmitted to the UE 115-c. After the AMF 120-c identifies that the UE 115-c has switched to a connected mode, the AMF 120-c may send to the PCF 225-b a UE connected indication. The PCF 225-b may send the policy information message 445 to the AMF 120-c based on receiving the UE connected indication.

In some examples, AMF 120-c may perform the querying described in block 440. In some examples, the PCF 225-b may send the policy information message 445 to the AMF 120-c when the UE 115-c is in an idle mode. In such examples, the AMF 120-c may store the policy information message 445 until the UE 115-c enters a connected mode. In some examples, the policy information 445 is communicated using a N15 interface.

The AMF 120-c may receive the policy information message 445, process the policy information message 445, and transmit a policy information message 450 to the UE 115-c. The policy information message 450 may be an example of a NAS message. Examples of processing performed by the AMF 120-c may include performing a deciphering and integrity check. In some examples, the AMF 120-c may append other data to the message 445 as part of generating the message 450, such as timestamps, policy identifiers, core network entity identifiers, or other data. In some examples, the policy information message 450 may be communicated via a Ni interface. In some examples, the message 450 is the same as the message 445. In some examples, the message 450 is different from the message 445.

The policy information message 450 may be a NAS message, in some examples. In some instances, the policy information message 450 may be transmitted over a NAS transport message. The policy information message 450 may also be sent as part of a registration request or a service request message. The policy information message 450 may be a registration request message, a service request message, a NAS transport message, or a session management message.

In some examples, the UE 115-c may receive a policy information message 450 (whether UE-initiated or network-initiated) enclosed in an RM response message upon successful completion of a RM procedure. In some examples, this is the same message that the PCF 225-b would send to the UE 115-c to do a push of a policy. In some examples, this message is carried in the registration accept using it as NAS transport. The AMF 120-c may trigger the PCF 225-b to initiate the policy push in some examples.

At block 455, the UE 115-c may update its policy information 310 based on the received policy information message 450. Updating may include overwriting the policy information 310 with the policy information included in the policy information message 450. In some examples, the UE 115-c may determine differences between the policy information 310 and the policy information found in the policy information message 450 and update only those differences.

In response to receiving the policy information message 450, the UE 115-c may optionally transmit an acknowledgement message 460 to the core network 130. The acknowledgement message may be configured to confirm reception of the policy information message 450. In some examples, the acknowledgement message 460 is a NAS message communicated using control plane signaling. In some examples, the acknowledgement message 460 may be communicated using the Ni interface. The AMF 120-c may optionally transmit an acknowledgement message 465 to the PCF 225-b (via the N15 interface) based on receiving the acknowledgement message 460.

In some examples, the UE 115-c may be roaming such that it is connected to a visitor network rather than a home network. In some examples, the UE 115-c may communicate with a visitor AMF (vAMF) using an Ni interface. A vAMF is an AMF associated with the visitor core network. The vAMF may be configured to communicate directly with a home PCF (i.e., a hPCF). The hPCF may be an example of the PCF 225-b described above and associated with the UE's home core network 130. To communicate directly messages 425, 445, and/or 465 may be communicated with a new network interface, not the N15 interface. In some examples, the new network interface may be used only for communicating policy requests and/or policy information with the UE 115-c.

Figure 5:
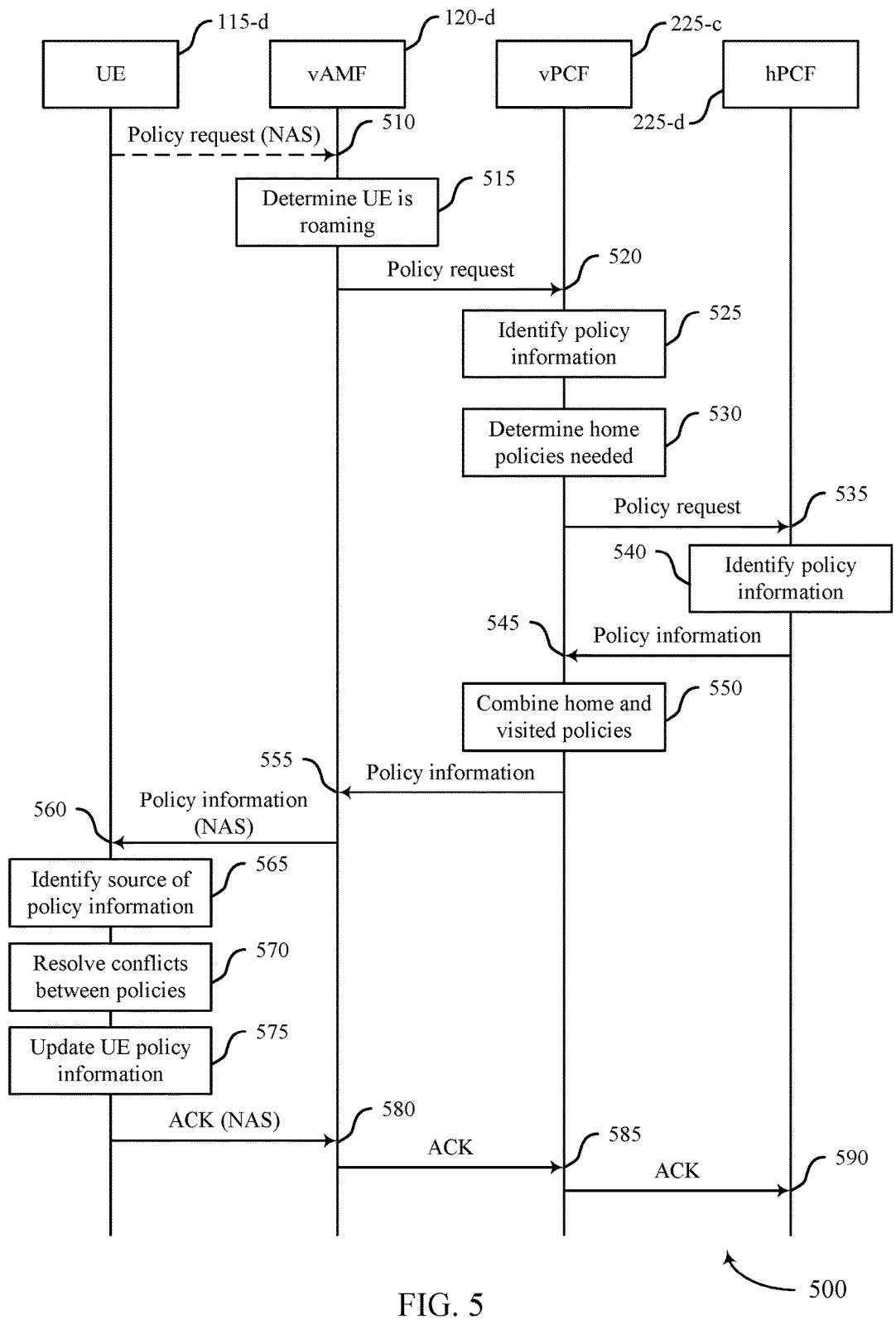
FIG. 5 illustrates an example of a communication scheme that supports policy communication via control plane signaling in accordance with one or more aspects of the present disclosure.

FIG. 5 illustrates an example of a communication scheme 500 that supports policy communication via control plane signaling in accordance with various aspects of the present disclosure. The communication scheme 500 illustrates a policy provisioning procedure in a roaming scenario. A UE 115-*d* is roaming when it is connected to a visitor network rather than its home network. The communication scheme 500 illustrates and describes functions and communications performed by a UE 115-*d*, a vAMF 120-*d*, a vPCF 225-*c*, and an hPCF 225-*d*. The AMF 120-*d*, the vPCF 225-*c*, and the hPCF 225-*d* may be examples of entities in the core network 130. These entities may be examples of other entities described with reference to FIGS. 1-3. The vAMF 120-*d* and vPCF 225-*c* may be examples of core network entities of a visitor core network of the UE 115-*d*. The hPCF 225-*d* may be an example of a core network entity of a home visitor core network of the UE 115-*d*.

The communication scheme 500 may incorporate some of the functionality of the communication scheme 400 described with reference to FIG. 4. Accordingly, not all functionality of the communication scheme 500 is repeated in full here.

The UE 115-*d* may transmit a policy information request message 510 to the vAMF 120-*d* of the visitor core network. The policy information request message 510 may be an example of the policy information request message 415. Before transmitting the policy information request message 510, the UE 115-*d* may perform the functions of blocks 405, 410. In some instances, the policy provisioning procedure may be initiated by the core network (visitor or home) rather than the UE 115-*d*. In such instances, the message 510 may be optional. The policy information request message 510 may be an example of a NAS message transmitted via control plane signaling.

At block 515, the vAMF 120-*d* may determine whether the UE 115-*d* is roaming. If the UE 115-*d* is roaming, the visitor core network may alter some of its operations or functions or account for the policies of the home core network and the visitor core network. The vAMF 120-*d* may determine roaming through a variety of ways. In some examples, the functions of block 515 may be performed by the UE 115-*d*, the vPCF 225-*c*, or some other visitor core network entity. If the UE 115-*d* performs the functions of block 515, message 510 may include information about the home core network of the UE 115-*d* or an indication that the UE 115-*d* is roaming.

The vAMF 120-*d* may communicate a policy information request message 520 to the vPCF 225-*c*. The policy information request message 520 may be an example of the message 425 described with reference to FIG. 4. The policy information request message 520 may include the contents of the message 510. In some examples, message 520 may include information about the home core network of the UE 115-*d* or an indication that the UE 115-*d* is roaming. Transmitting the message 520 may include performing the functions of block 420 described with reference to FIG. 4.

At block 525, the vPCF 225-*c* may identify the policy information to provide to the UE 115-*d*. Block 525 may be an example of block 435 described with reference to FIG. 4. In some examples, block 525 may include performing the functions of blocks 430 and 440 described with reference to FIG. 4.

At block 530, the vPCF 225-*c* may determine whether policy information is needed from the home core network of the UE 115-*d*. If policies from the home network are unnecessary, the communication scheme 500 may jump to generating and transmitting policy information message 555. Otherwise, the communication scheme 500 may proceed to transmitting policy information request message 535.

The vPCF 225-*c* may generate and transmit the policy information request message 535 based on the determination of block 530. The policy information request message 535 may be an example of the policy information request messages 520, 425. In some examples, message 535 may include additional information such as policy identifiers of the policies needed from the hPCF 225-*d*. The vPCF 225-*c* may identify which policy information is needed from the home network and include that information in message 535. In some examples, the message 535 may be communicated via a N15r interface.

At block 540, the hPCF 225-*d* receives the message 535 and may identify policy information to provide to the UE 115-*d*. In some examples, the identified policy information may be based on the contents of the message 535. Block 525 may be an example of block 435 described with reference to FIG. 4. In some examples, block 525 may include performing the functions of blocks 430 and 440 described with reference to FIG. 4.

The hPCF 225-*d* may generate and transmit a policy information message 545 that includes the identified policy information. The policy information message 545 may be an example of the message 445. In some examples, the message 535 may be communicated via a N15r interface.

At block 550, upon receiving the message 545, the vPCF 225-*c* may combine the visitor network policy information and the home network policy information. In some examples, the combining may be based at least in part on a conflict resolution procedure. In some cases, the conflict resolution procedure may include adding combining all of the policy information together without modifying any of the procedures. In some cases, the conflict resolution procedure may include only sending the policy information of the home network. In some cases, the conflict resolution procedure may include only sending the policy information of the visitor network. In some cases, the conflict resolution procedure may overruling or some of the policy information of the home network based on policy information of visitor network. For example, the vPCF 225-*c* may compare the policy information received from the hPCF 225-*d* to the policy information of the visitor network or to some other data. The vPCF 225-*c* may delete any policy information from the home network that conflicts with one or more policies of the visitor network.

The vPCF 225-*d* may generate and transmit a policy information message 555 based on the combined policy information generated by the vPCF 225-*d*. The policy information message 555 may be an example of the message 445 described with reference to FIG. 4. The policy information message 555 may be communicated using the N15 interface.

Upon receiving the message 555, the vAMF 120-*d* may generate and transmit a policy information message 560 based on the combined policy information generated by the vPCF 225-*d* and the message 555. The policy information message 560 may be an example of the message 450 described with reference to FIG. 4. The policy information message 560 may be an example of a NAS message. The policy information message 560 may be communicated using the Ni interface.

At block 565, upon receiving the message 560, the UE 115-*d* may identify sources of the policy information included in the policy information message 560. If the message 560 includes policy information from multiple sources, the UE 115-*d* may resolve conflicts between information. If the message 560 includes policy information from only one source, the UE 115-*d* may skip performing the functions of block 570. In some examples, the core network curates the policy information in the message 560 at block 550. In other examples, the core network merely passes on some or all of the policy information to the UE 115-*d*, whether conflicting or not. The messages 555, 560 may include information indicating the source of policy information included in the messages 555, 560.

At block 570, the UE 115-*d* may resolve conflicts between policy information included in the message 560. In some cases, the UE 115-*d* may prioritize information from one source over information from another source. For example, the UE 115-*d* may prioritize policy information from the hPCF 225-*d* over policy information from the vPCF 225-*c*. In another example, the UE 115-*d* may prioritize policy information from the vPCF 225-*c* over policy information from the hPCF 225-*d*. In other examples, the UE 115-*d* may prioritize policy information based on both the type of policy and the source of the policy information. Where conflicts in policy information arise, the UE 115-*d* may update its policy information 310 based on its prioritization.

In response to receiving the policy information message 560, the UE 115-*d* may optionally transmit an acknowledgement message 580 to the core network. The acknowledgement message 580 may be configured to confirm reception of the policy information message 560. In some examples, the acknowledgement message 580 is a NAS message communicated using control plane signaling. In some examples, the acknowledgement message 580 may be communicated using the Ni interface. The vAMF 120-*d* may optionally transmit an acknowledgement message 585 to the vPCF 225-*c* (via the N15 interface) based on receiving the acknowledgement message 585. The vPCF 225-*c* may optionally transmit an acknowledgement message 590 to the hPCF 225-*d* (via the N15r interface) based on receiving the acknowledgement message 585. The acknowledgement messages 580, 585, 590 may be examples of the acknowledgement messages 460, 465 described with reference to FIG. 4.

Figure 6:
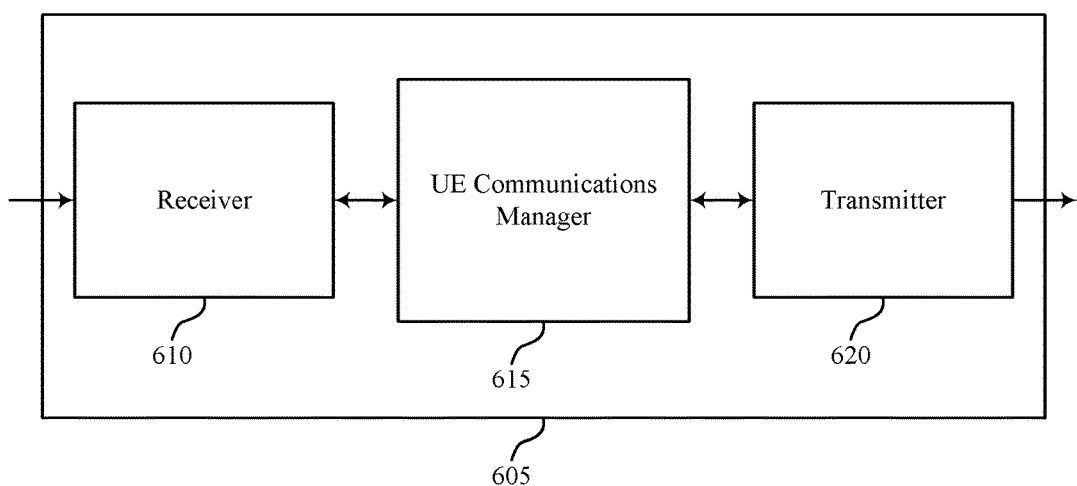
FIGS. 6 through 8 show block diagrams of a device that supports policy communication via control plane signaling in accordance with one or more aspects of the present disclosure.

FIG. 6 shows a block diagram 600 of a wireless device 605 that supports policy communication via control plane signaling in accordance with aspects of the present disclosure. Wireless device 605 may be an example of aspects of a UE 115 as described herein. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to policy communication via control plane signaling, etc.). Information may be passed on to other components of the device. The receiver 610 may be an example of aspects of the transceiver 935 described with reference to FIG. 9. The receiver 610 may utilize a single antenna or a set of antennas. Receiver 610 may receive, by a UE, a first NAS message over a control plane that includes policy information associated with the UE.

UE communications manager 615 may be an example of aspects of the communications manager 915 described with reference to FIG. 9. UE communications manager 615 and/or at least some of its various sub-components may be implemented in hardware, software executed by a processor, firmware, or any combination thereof. If implemented in software executed by a processor, the functions of the UE communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 615 and/or at least some of its various sub-components may be physically located at various positions, including being distributed such that portions of functions are implemented at different physical locations by one or more physical devices. In some examples, UE communications manager 615 and/or at least some of its various sub-components may be a separate and distinct component in accordance with various aspects of the present disclosure. In other examples, UE communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 615 may identify the policy information based on receiving the first NAS message and update the policy information stored by the UE based on the received policy information.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Transmitter 620 may transmit a second NAS message over the control plane requesting the policy information from the core network, where receiving the first NAS message is based on transmitting the second NAS message. In some cases, the second NAS message includes a request for the policy information exclusive of any specific policy information identifiers. In some cases, the second NAS message is one of a registration request message, a service request message, a NAS transport message, or a session management message. In some cases, the first NAS message is generated without the UE transmitting a policy request message.

Figure 7:
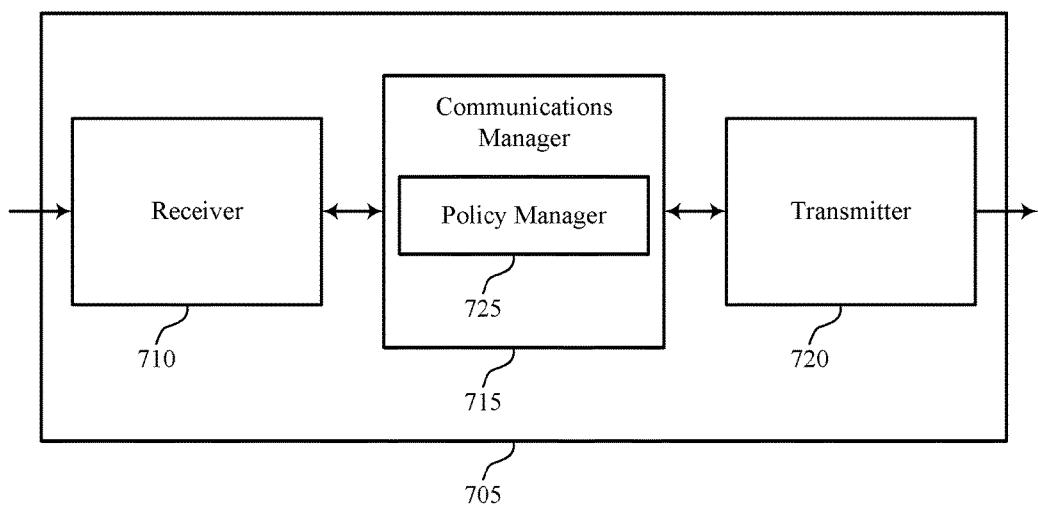

FIG. 7 shows a block diagram 700 of a wireless device 705 that supports policy communication via control plane signaling in accordance with aspects of the present disclosure. Wireless device 705 may be an example of aspects of a wireless device 605 or a UE 115 as described with reference to FIG. 6. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to policy communication via control plane signaling, etc.). Information may be passed on to other components of the device. The receiver 10 may be an example of aspects of the transceiver 935 described with reference to FIG. 9. The receiver 710 may utilize a single antenna or a set of antennas.

UE communications manager 715 may be an example of aspects of the UE communications manager 915 described with reference to FIG. 9. UE communications manager 715 may also include policy manager 725.

Policy manager 725 may identify the policy information based on receiving the first NAS message, update the policy information stored by the UE based on the received policy information, and identify an individual policy to be updated, the second NAS message including data indicating the individual policy, where identifying the policy provisioning trigger is based on identifying the individual policy.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
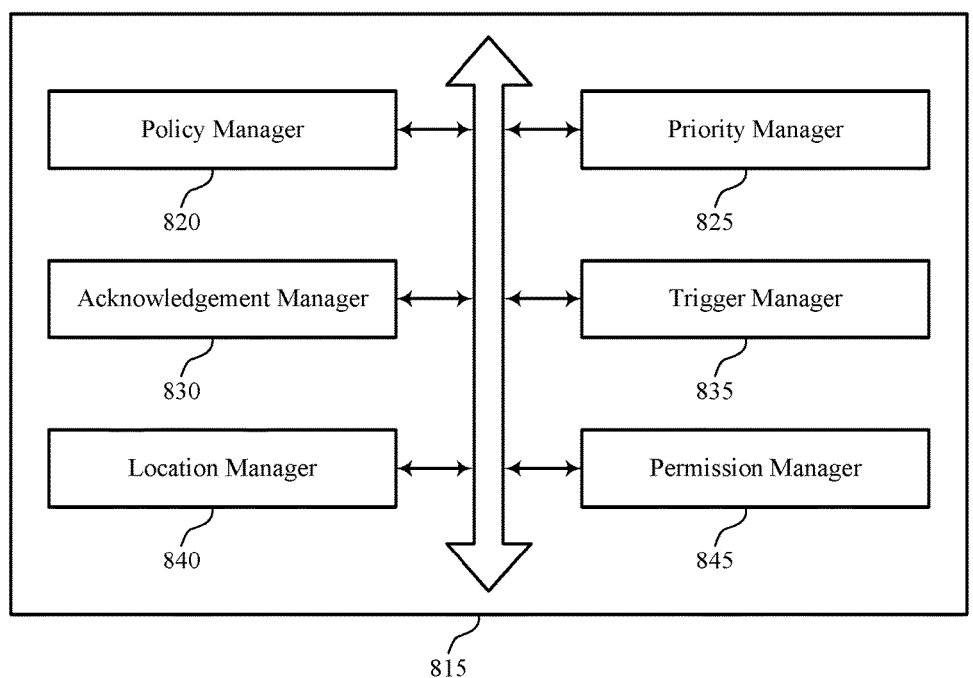

FIG. 8 shows a block diagram 800 of a UE communications manager 815 that supports policy communication via control plane signaling in accordance with aspects of the present disclosure. The UE communications manager 815 may be an example of aspects of a UE communications manager 615, a UE communications manager 715, or a UE communications manager 915 described with reference to FIGS. 6, 7, and 9. The UE communications manager 815 may include policy manager 820, priority manager 825, acknowledgement manager 830, trigger manager 835, location manager 840, and permission manager 845. Each of these modules may communicate, directly or indirectly, with one another (e.g., via one or more buses).

Policy manager 820 may identify the policy information based on receiving the first NAS message, update the policy information stored by the UE based on the received policy information, and identify an individual policy to be updated, the second NAS message including data indicating the individual policy, where identifying the policy provisioning trigger is based on identifying the individual policy.

Priority manager 825 may prioritize the received policy information based on which core network entity generated the received policy information, where updating the policy information is based on the prioritizing and prioritize a first subset of the policy information received from a visiting core network over a second subset of the policy information received from a home core network of the UE, where updating the policy information is based at least in part the prioritizing.

Acknowledgement manager 830 may transmit an acknowledgement NAS message over the control plane based on receiving the first NAS message.

Trigger manager 835 may identify a policy provisioning trigger indicating that UE is to receive the policy information associated with the UE from a core network.

Location manager 840 may identify a location of the UE, where identifying the policy provisioning trigger is based on identifying the location.

Permission manager 845 may receive a permission message indicating a first subset of the policy information capable of being communicated over the control plane, where transmitting the second NAS message is based on the first subset of the policy information.

Figure 9:
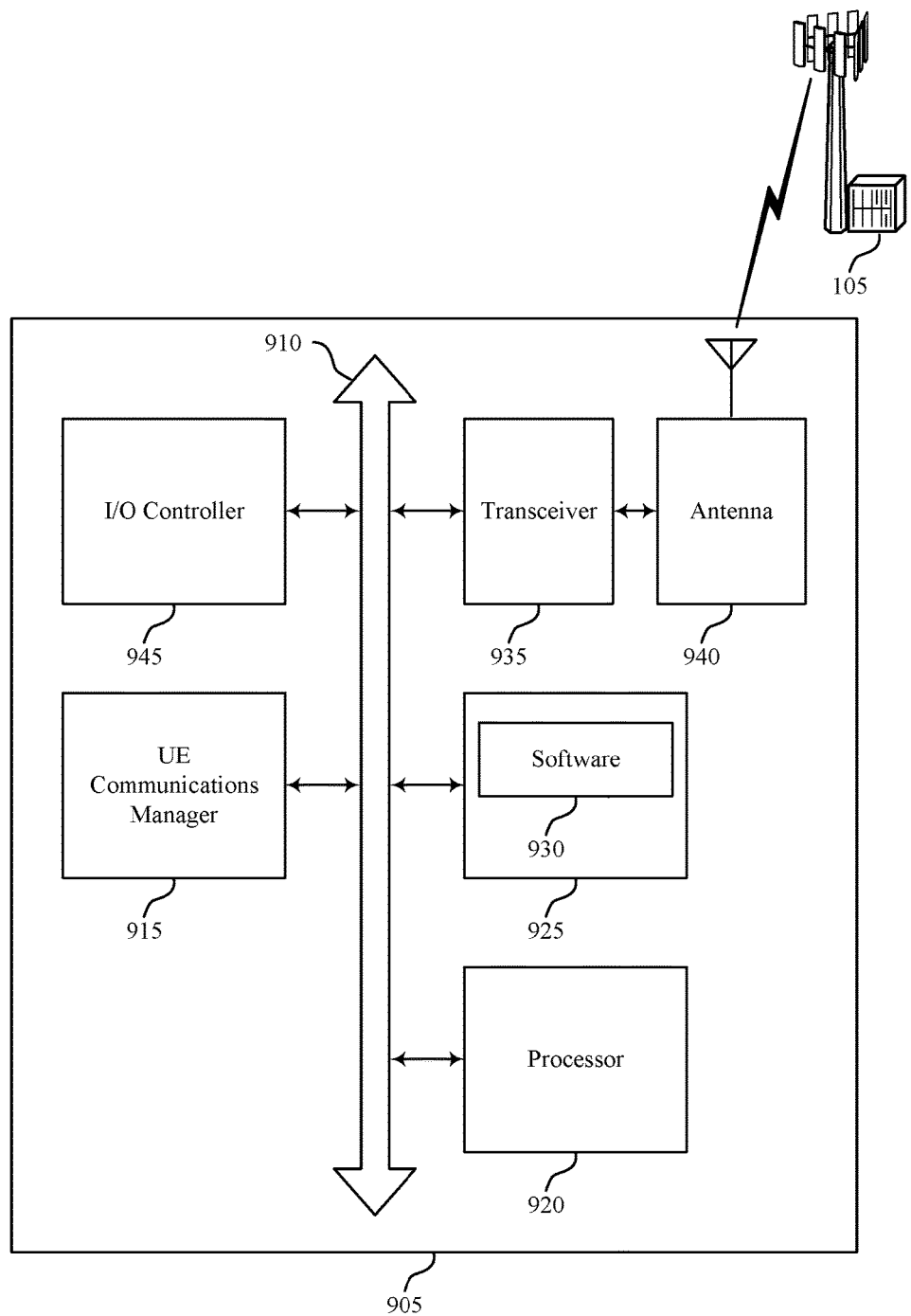
FIG. 9 illustrates a block diagram of a system including a UE that supports policy communication via control plane signaling in accordance with one or more aspects of the present disclosure.

FIG. 9 shows a diagram of a system 900 including a device 905 that supports policy communication via control plane signaling in accordance with one or more aspects of the present disclosure. Device 905 may be an example of or include the components of wireless device 605, wireless device 705, or a UE 115 as described above, e.g., with reference to FIGS. 1, 6 and 7. Device 905 may include components for bi-directional voice and data communications including components for transmitting and receiving communications, including UE communications manager 915, processor 920, memory 925, software 930, transceiver 935, antenna 940, and I/O controller 945. These components may be in electronic communication via one or more busses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting policy communication via control plane signaling).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware and/or software operation such as the interaction with peripheral components or devices.

Software 930 may include code to implement aspects of the present disclosure, including code to support policy communication via control plane signaling. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
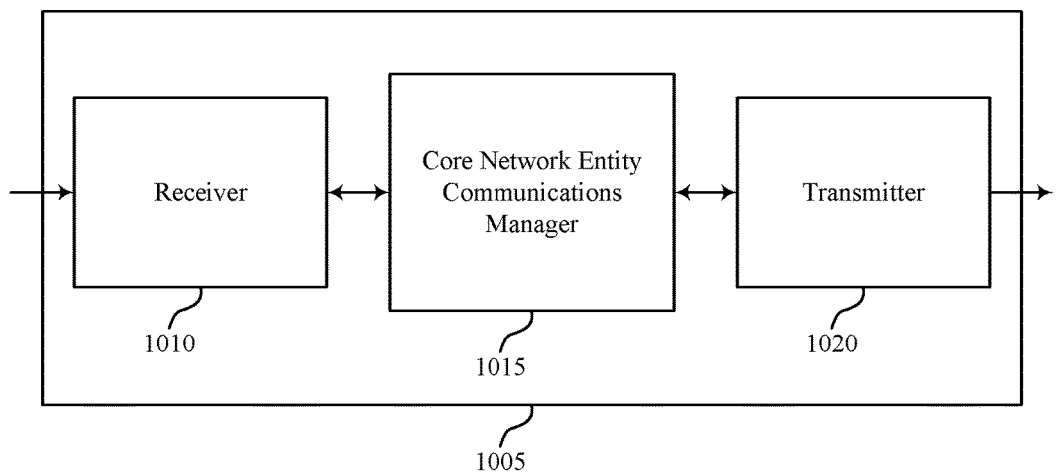
FIGS. 10 through 12 show block diagrams of a device that supports policy communication via control plane signaling in accordance with one or more aspects of the present disclosure.

FIG. 10 shows a block diagram 1000 of a wireless device 1005 that supports policy communication via control plane signaling in accordance with one or more aspects of the present disclosure. Wireless device 1005 may be an example of aspects of a core network entity 120 or 225 as described with reference to FIG. 1. Wireless device 1005 may include receiver 1010, core network entity communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to policy communication via control plane signaling, etc.). Information may be passed on to other components of the device. The receiver 1010 may be an example of aspects of the transceiver 1335 described with reference to FIG. 13. The receiver 1010 may utilize a single antenna or a set of antennas.

Receiver 1010 may receive a second message via control plane signaling from the UE, the second message requesting the policy information from the core network, where identifying the policy provisioning trigger is based on receiving the second message.

Core network entity communications manager 1015 may be an example of aspects of the core network entity communications manager 1315 described with reference to FIG. 13. Core network entity communications manager 1015 and/or at least some of its various sub-components may be implemented in hardware, software executed by a processor, firmware, or any combination thereof. If implemented in software executed by a processor, the functions of the core network entity communications manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The core network entity communications manager 1015 and/or at least some of its various sub-components may be physically located at various positions, including being distributed such that portions of functions are implemented at different physical locations by one or more physical devices. In some examples, core network entity communications manager 1015 and/or at least some of its various sub-components may be a separate and distinct component in accordance with various aspects of the present disclosure. In other examples, core network entity communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Core network entity communications manager 1015 may identify a policy provisioning trigger indicating that a UE is to receive policy information associated with the UE from a core network and identify the policy information based on the policy provisioning trigger.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Transmitter 1020 may transmit a first message via control plane signaling to the UE, the first message including the identified policy information. In some cases, the first control message is a NAS message.

Figure 11:
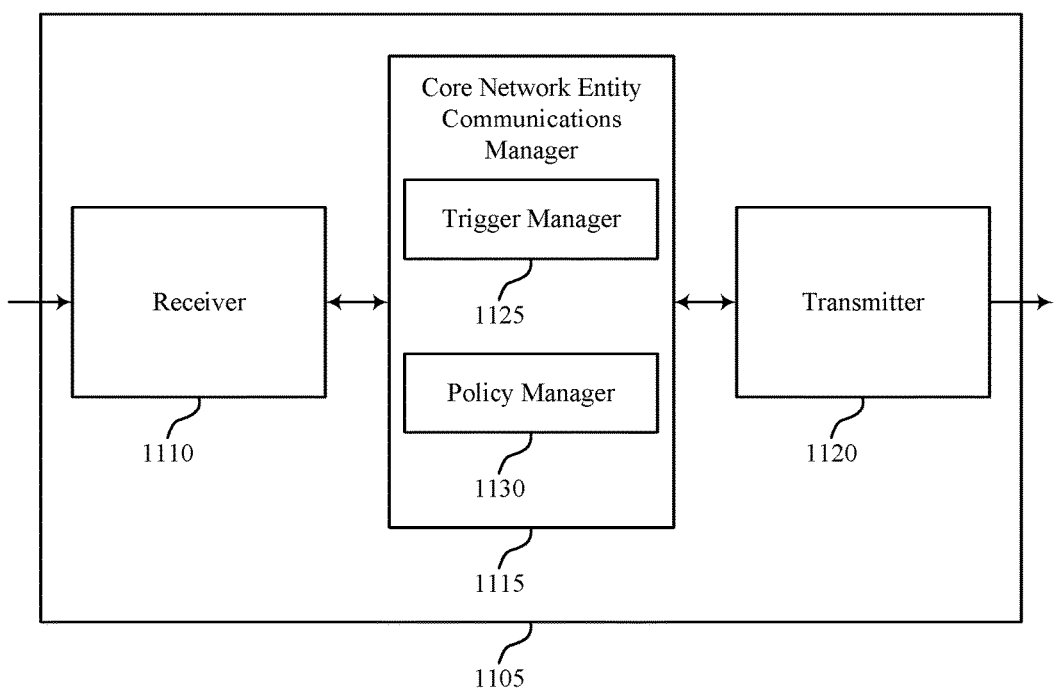

FIG. 11 shows a block diagram 1100 of a wireless device 1105 that supports policy communication via control plane signaling in accordance with one or more aspects of the present disclosure. Wireless device 1105 may be an example of aspects of a wireless device 1005 or a core network entity 120 or 225 as described with reference to FIGS. 1 and 10. Wireless device 1105 may include receiver 1110, core network entity communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to policy communication via control plane signaling, etc.). Information may be passed on to other components of the device. The receiver 1110 may be an example of aspects of the transceiver 1335 described with reference to FIG. 13. The receiver 1110 may utilize a single antenna or a set of antennas.

Core network entity communications manager 1115 may be an example of aspects of the core network entity communications manager 1315 described with reference to FIG. 13. Core network entity communications manager 1115 may also include trigger manager 1125 and policy manager 1130.

Trigger manager 1125 may identify a policy provisioning trigger indicating that a UE is to receive policy information associated with the UE from a core network.

Policy manager 1130 may identify the policy information based on the policy provisioning trigger, identify a change in a policy, where identifying the policy provisioning trigger is based on the change in the policy, identify a change in a location of the UE, where identifying the policy provisioning trigger is based on the change in the location, and identify what policy information the UE is permitted to receive over the control plane, where transmitting the first message is based on the identifying.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
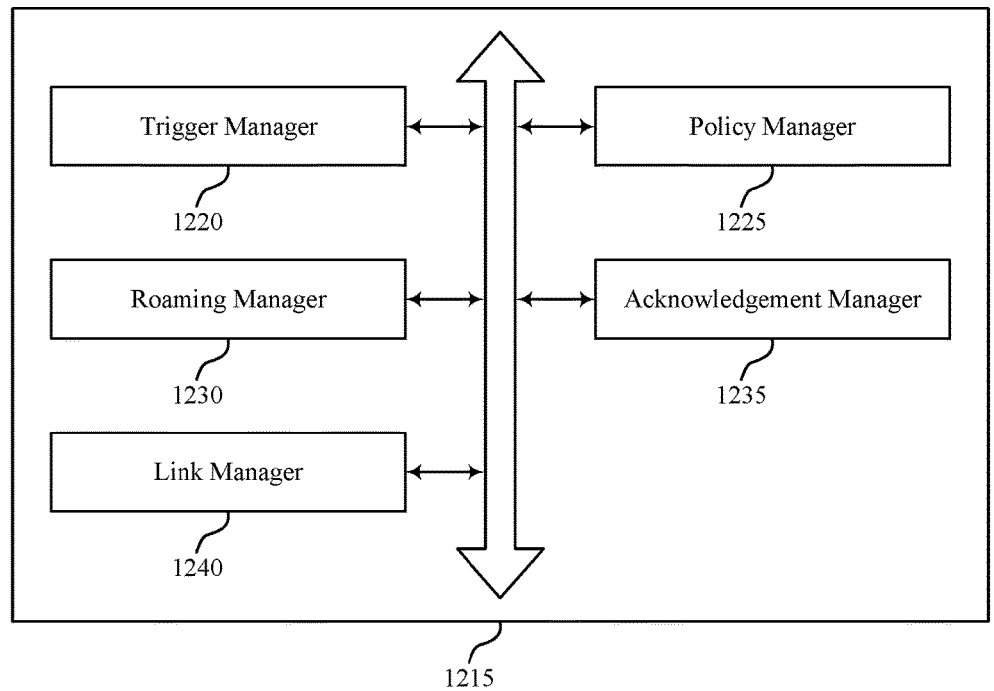

FIG. 12 shows a block diagram 1200 of a core network entity communications manager 1215 that supports policy communication via control plane signaling in accordance with one or more aspects of the present disclosure. The core network entity communications manager 1215 may be an example of aspects of a core network entity communications manager 1315 described with reference to FIGS. 10, 11, and 13. The core network entity communications manager 1215 may include trigger manager 1220, policy manager 1225, roaming manager 1230, acknowledgement manager 1235, and link manager 1240. Each of these modules may communicate, directly or indirectly, with one another (e.g., via one or more buses).

Trigger manager 1220 may identify a policy provisioning trigger indicating that a UE is to receive policy information associated with the UE from a core network.

Policy manager 1225 may identify the policy information based on the policy provisioning trigger, identify a change in a policy, where identifying the policy provisioning trigger is based on the change in the policy, identify a change in a location of the UE, where identifying the policy provisioning trigger is based on the change in the location, and identify what policy information the UE is permitted to receive over the control plane, where transmitting the first message is based on the identifying.

Roaming manager 1230 may identify that the UE is roaming such that the UE is connected to a visiting core network rather than a home core network, request, by a visiting core network entity, the policy information directly from a home policy management entity, request, by a first visiting core network entity, the policy information from a visiting policy management entity associated with the UE, request, by the visiting policy management entity, policy information from a home policy management entity associated with the UE, combine policy information from the home policy management entity and policy information from the visiting policy management entity based on a conflict resolution procedure, where the first message includes the combined policy information, and determine, by the visiting policy management entity, whether to request policy information from a home policy management entity associated with the UE.

Acknowledgement manager 1235 may receive an acknowledgement message via control plane signaling from the UE based on transmitting the first message.

Link manager 1240 may determine whether the UE is in a connected mode or an idle mode, where transmitting the first message is based on the determining.

Figure 13:
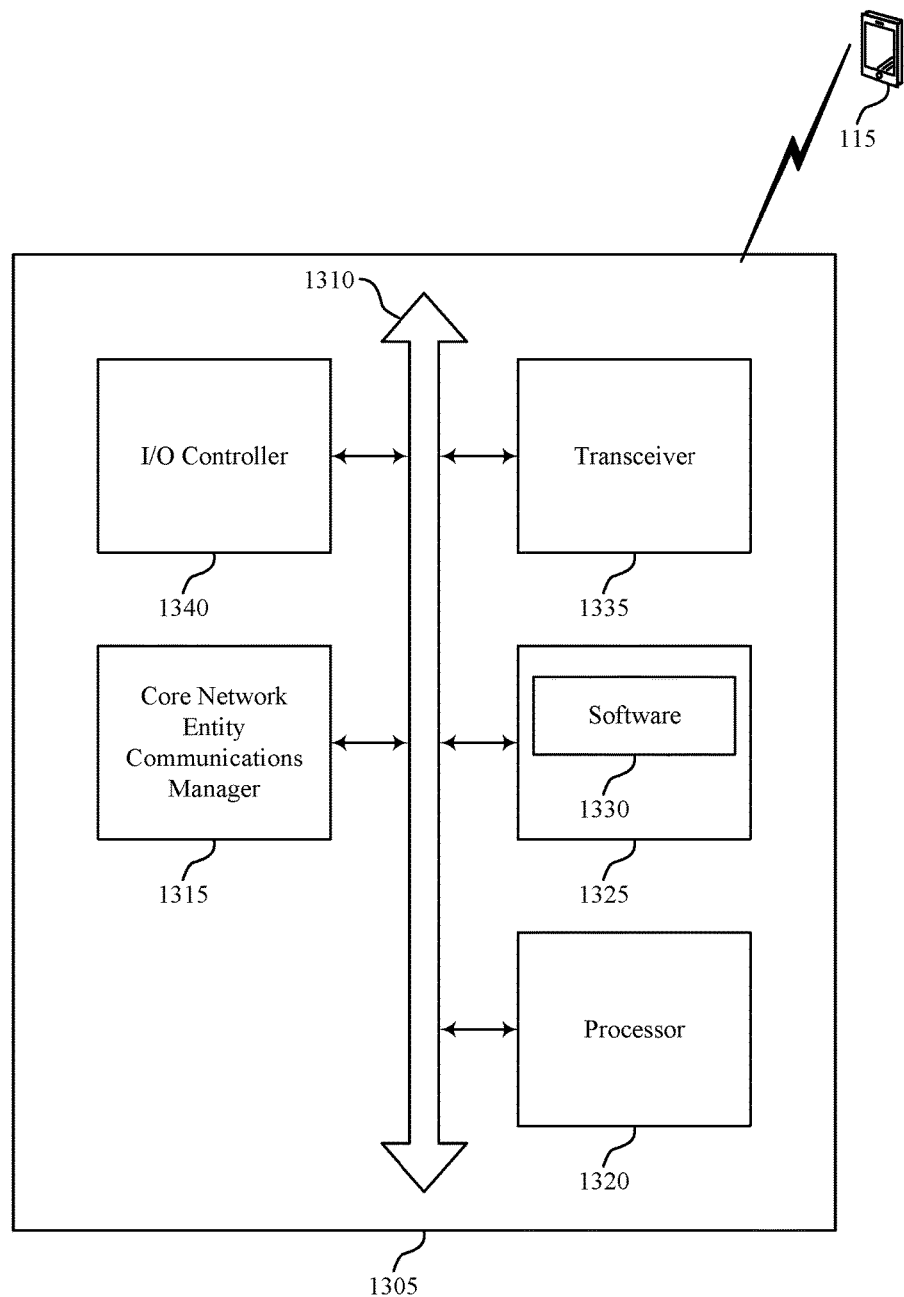
FIG. 13 illustrates a block diagram of a system including a core network entity that supports policy communication via control plane signaling in accordance with one or more aspects of the present disclosure.

FIG. 13 shows a diagram of a system 1300 including a device 1305 that supports policy communication via control plane signaling in accordance with one or more aspects of the present disclosure. Device 1305 may be an example of or include the components of core network entity 120 or 225 as described above, e.g., with reference to FIG. 1. Device 1305 may include components for bi-directional voice and data communications including components for transmitting and receiving communications, including core network entity communications manager 1315, processor 1320, memory 1325, software 1330, transceiver 1335, and I/O controller 1340. These components may be in electronic communication via one or more busses (e.g., bus 1310).

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting policy communication via control plane signaling).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware and/or software operation such as the interaction with peripheral components or devices.

Software 1330 may include code to implement aspects of the present disclosure, including code to support policy communication via control plane signaling. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

I/O controller 1340 may manage input and output signals for device 1305. I/O controller 1340 may also manage peripherals not integrated into device 1305. In some cases, I/O controller 1340 may represent a physical connection or port to an external peripheral. In some cases, I/O controller 1340 may utilize an operating system such as iOS®, ANDROID®, MS-DOS®, MS-WINDOWS®, OS/2®, UNIX®, LINUX®, or another known operating system. In other cases, I/O controller 1340 may represent or interact with a modem, a keyboard, a mouse, a touchscreen, or a similar device. In some cases, I/O controller 1340 may be implemented as part of a processor. In some cases, a user may interact with device 1305 via I/O controller 1340 or via hardware components controlled by I/O controller 1340.

Figure 14:
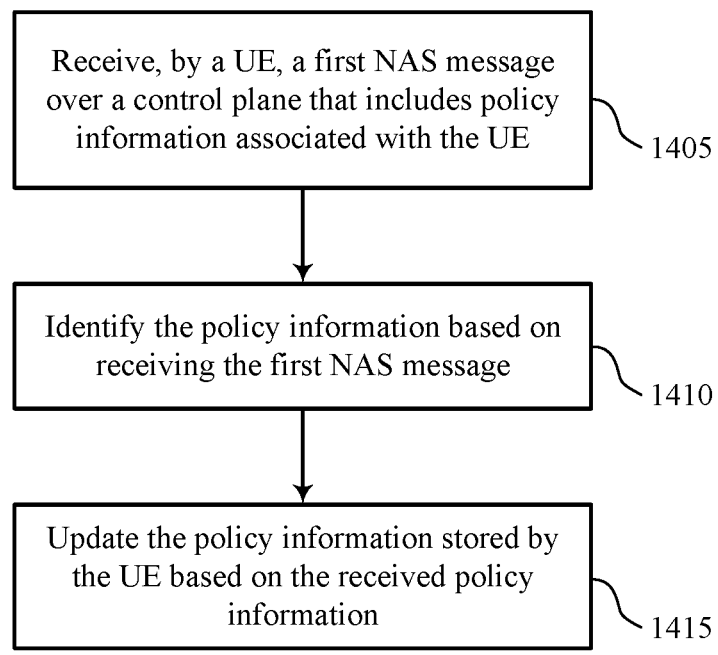
FIGS. 14 through 18 illustrate methods for policy communication via control plane signaling in accordance with one or more aspects of the present disclosure.

FIG. 14 shows a flowchart illustrating a method 1400 for policy communication via control plane signaling in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1405 the UE 115 may receive, by a UE, a first NAS message over a control plane that includes policy information associated with the UE. The operations of 1405 may be performed according to the methods described herein. In certain examples, aspects of the operations of 1405 may be performed by a receiver as described with reference to FIGS. 6 through 9.

At 1410 the UE 115 may identify the policy information based at least in part on receiving the first NAS message. The operations of 1410 may be performed according to the methods described herein. In certain examples, aspects of the operations of 1410 may be performed by a policy manager as described with reference to FIGS. 6 through 9.

At 1415 the UE 115 may update the policy information stored by the UE based at least in part on the received policy information. The operations of 1415 may be performed according to the methods described herein. In certain examples, aspects of the operations of 1415 may be performed by a policy manager as described with reference to FIGS. 6 through 9.

Figure 15:
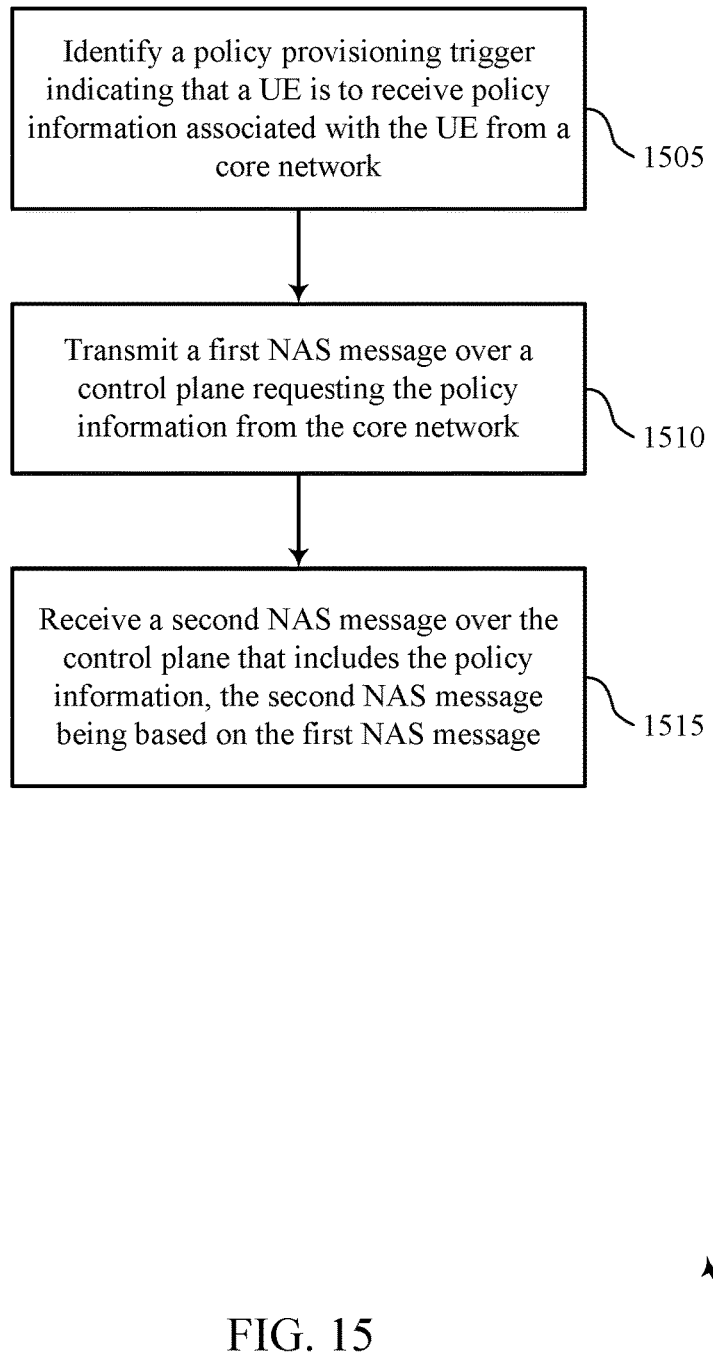

FIG. 15 shows a flowchart illustrating a method 1500 for policy communication via control plane signaling in accordance with one or more aspects of the present disclosure. The operations of method 1500 may be implemented by a core network entity 120 or 225 or its components as described herein. For example, the operations of method 1500 may be performed by a core network entity communications manager as described with reference to FIGS. 10 through 13. In some examples, a core network entity 120 or 225 may execute a set of codes to control the functional elements of the device to perform the functions described below. Additionally or alternatively, the core network entity 120 or 225 may perform aspects of the functions described below using special-purpose hardware.

At block 1505 the core network entity 120 or 225 may identify a policy provisioning trigger indicating that a UE is to receive policy information associated with the UE from a core network. The operations of block 1505 may be performed according to the methods described with reference to FIGS. 1 through 5. In certain examples, aspects of the operations of block 1505 may be performed by a trigger manager as described with reference to FIGS. 10 through 13.

At block 1510 the core network entity 120 or 225 may identify the policy information based at least in part on the policy provisioning trigger. The operations of block 1510 may be performed according to the methods described with reference to FIGS. 1 through 5. In certain examples, aspects of the operations of block 1510 may be performed by a policy manager as described with reference to FIGS. 10 through 13.

At block 1515 the core network entity 120 or 225 may transmit a first message via control plane signaling to the UE, the first message including the identified policy information. The operations of block 1515 may be performed according to the methods described with reference to FIGS. 1 through 5. In certain examples, aspects of the operations of block 1515 may be performed by a transmitter as described with reference to FIGS. 10 through 13.

Figure 16:
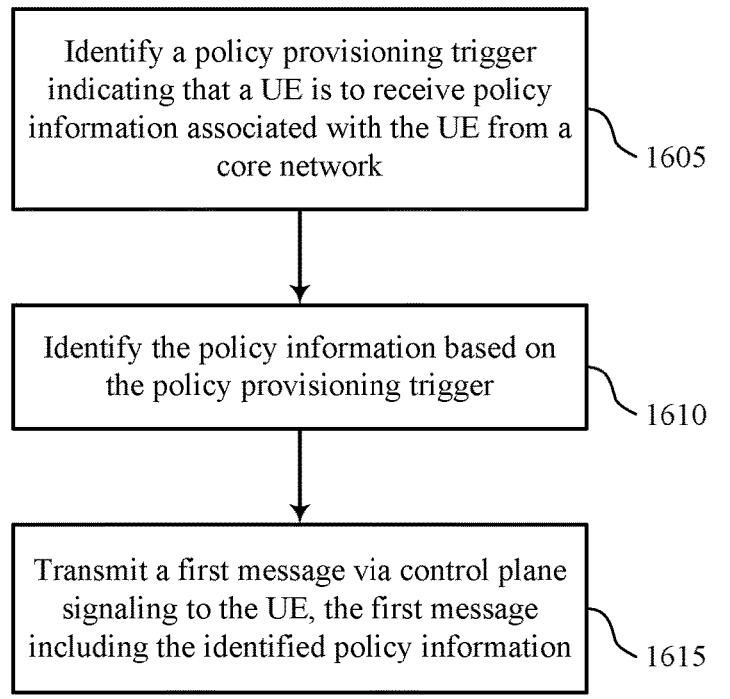

FIG. 16 shows a flowchart illustrating a method 1600 for policy communication via control plane signaling in accordance with one or more aspects of the present disclosure. The operations of method 1600 may be implemented by a UE 115 or its components as described herein. For example, the operations of method 1600 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may identify a policy provisioning trigger indicating that a UE is to receive policy information associated with the UE from a core network. The operations of block 1605 may be performed according to the methods described with reference to FIGS. 1 through 5. In certain examples, aspects of the operations of block 1605 may be performed by a trigger manager as described with reference to FIGS. 6 through 9.

At block 1610 the UE 115 may transmit a first NAS message over a control plane requesting the policy information from the core network. The operations of block 1610 may be performed according to the methods described with reference to FIGS. 1 through 5. In certain examples, aspects of the operations of block 1610 may be performed by a transmitter as described with reference to FIGS. 6 through 9.

At block 1615 the UE 115 may receive a second NAS message over the control plane that includes the policy information, the second NAS message being based at least in part on the first NAS message. The operations of block 1615 may be performed according to the methods described with reference to FIGS. 1 through 5. In certain examples, aspects of the operations of block 1615 may be performed by a receiver as described with reference to FIGS. 6 through 9.

Figure 17:
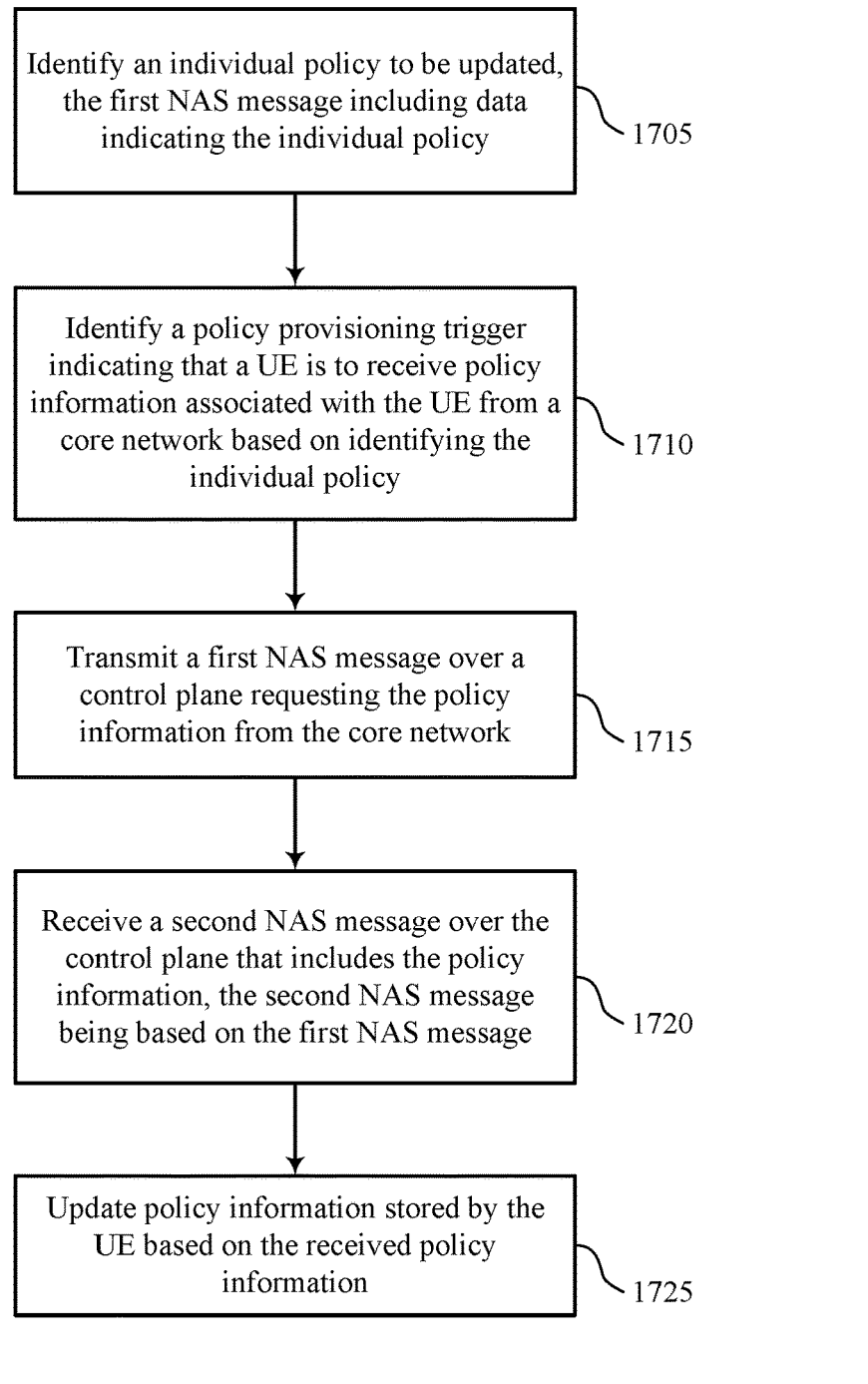

FIG. 17 shows a flowchart illustrating a method 1700 for policy communication via control plane signaling in accordance with one or more aspects of the present disclosure. The operations of method 1700 may be implemented by a UE 115 or its components as described herein. For example, the operations of method 1700 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1705 the UE 115 may identify an individual policy to be updated, the first NAS message including data indicating the individual policy. The operations of block 1705 may be performed according to the methods described with reference to FIGS. 1 through 5. In certain examples, aspects of the operations of block 1705 may be performed by a policy manager as described with reference to FIGS. 6 through 9.

At block 1710 the UE 115 may identify a policy provisioning trigger indicating that a UE is to receive policy information associated with the UE from a core network based at least in part on identifying the individual policy. The operations of block 1710 may be performed according to the methods described with reference to FIGS. 1 through 5. In certain examples, aspects of the operations of block 1710 may be performed by a trigger manager as described with reference to FIGS. 6 through 9.

At block 1715 the UE 115 may transmit a first NAS message over a control plane requesting the policy information from the core network. The operations of block 1715 may be performed according to the methods described with reference to FIGS. 1 through 5. In certain examples, aspects of the operations of block 1715 may be performed by a transmitter as described with reference to FIGS. 6 through 9.

At block 1720 the UE 115 may receive a second NAS message over the control plane that includes the policy information, the second NAS message being based at least in part on the first NAS message. The operations of block 1720 may be performed according to the methods described with reference to FIGS. 1 through 5. In certain examples, aspects of the operations of block 1720 may be performed by a receiver as described with reference to FIGS. 6 through 9.

At block 1725 the UE 115 may update policy information stored by the UE based at least in part on the received policy information. The operations of block 1725 may be performed according to the methods described with reference to FIGS. 1 through 5. In certain examples, aspects of the operations of block 1725 may be performed by a policy manager as described with reference to FIGS. 6 through 9.

Figure 18:
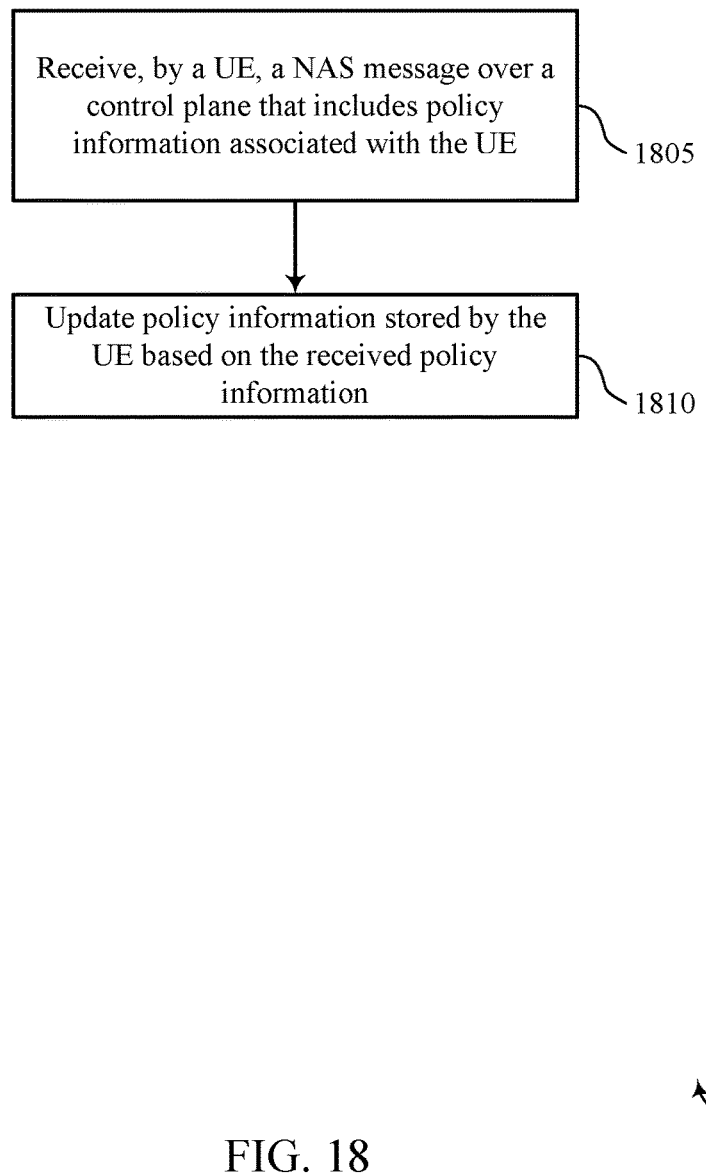

FIG. 18 shows a flowchart illustrating a method 1800 for policy communication via control plane signaling in accordance with one or more aspects of the present disclosure. The operations of method 1800 may be implemented by a UE 115 or its components as described herein. For example, the operations of method 1800 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1805 the UE 115 may receive, by a UE, a NAS message over a control plane that includes policy information associated with the UE. The operations of block 1805 may be performed according to the methods described with reference to FIGS. 1 through 5. In certain examples, aspects of the operations of block 1805 may be performed by a receiver as described with reference to FIGS. 6 through 9.

At block 1810 the UE 115 may update policy information stored by the UE based at least in part on the received policy information. The operations of block 1810 may be performed according to the methods described with reference to FIGS. 1 through 5. In certain examples, aspects of the operations of block 1810 may be performed by a policy manager as described with reference to FIGS. 6 through 9.

It should be noted that the methods described above describe possible implementations, and that the operations and the operations may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   transmitting, by a user equipment (UE), a first non-access stratum (NAS) message over a control plane to a core network;
   receiving, by the UE, a second NAS message over the control plane that includes policy information associated with the UE, the second NAS message being responsive to the first NAS message;
   identifying the policy information based at least in part on the receiving the second NAS message; and
   updating policy information stored by the UE based at least in part on the received policy information.

2. The method of claim 1, further comprising:
   prioritizing the received policy information based at least in part on which core network entity generated the received policy information, wherein the updating the policy information stored by the UE is based at least in part on the prioritizing.

3. The method of claim 1, further comprising:
   prioritizing a first subset of the policy information received from a visiting core network over a second subset of the policy information received from a home core network of the UE, wherein the updating the policy information stored by the UE is based at least in part the prioritizing.

4. The method of claim 1, further comprising:
   transmitting an acknowledgement NAS message over the control plane based at least in part on the receiving the second NAS message.

5. The method of claim 1, further comprising:
   identifying a policy provisioning trigger indicating that the UE is to receive the policy information associated with the UE from the core network.

6. The method of claim 5, further comprising:
   identifying an individual policy to be updated, the first NAS message including data indicating the individual policy, wherein the identifying the policy provisioning trigger is based at least in part on the identifying the individual policy.

7. The method of claim 5, further comprising:
identifying a location of the UE, wherein the identifying the policy provisioning trigger is based at least in part on the identifying the location.

8. The method of claim 5, further comprising:
receiving a permission message indicating a first subset of the policy information capable of being communicated over the control plane, wherein the transmitting the first NAS message is based at least in part on the first subset of the policy information.

9. The method of claim 5, wherein:
the first NAS message includes a request for the policy information exclusive of any specific policy information identifiers.

10. The method of claim 5, wherein:
the first NAS message is one of a registration request message, a service request message, a NAS transport message, or a session management message.

11. A method for wireless communication, comprising:
receiving a first message via control plane signaling from a user equipment (UE);
identifying a policy provisioning trigger indicating that the UE is to receive policy information associated with the UE from a core network based at least in part on the receiving the first message;
identifying the policy information based at least in part on the policy provisioning trigger; and
transmitting a second message via control plane signaling to the UE, the second message including the identified policy information.

12. The method of claim 11, further comprising:
identifying a change in a policy, wherein the identifying the policy provisioning trigger is based at least in part on the change in the policy.

13. The method of claim 11, further comprising:
identifying a change in a location of the UE, wherein the identifying the policy provisioning trigger is based at least in part on the change in the location.

14. The method of claim 11, further comprising:
identifying that the UE is roaming such that the UE is connected to a visiting core network rather than a home core network.

15. The method of claim 11, further comprising:
requesting, by a visiting core network entity, the policy information directly from a home policy management entity.

16. The method of claim 11, further comprising:
requesting, by a first visiting core network entity, the policy information from a visiting policy management entity associated with the UE.

17. The method of claim 16, further comprising:
requesting, by the visiting policy management entity, the policy information from a home policy management entity associated with the UE.

18. The method of claim 17, further comprising:
combining policy information from the home policy management entity and policy information from the visiting policy management entity based at least in part on a conflict resolution procedure, wherein the second message includes the combined policy information.

19. The method of claim 16, further comprising:
determining, by the visiting policy management entity, whether to request policy information from a home policy management entity associated with the UE.

20. The method of claim 11, further comprising:
receiving an acknowledgement message via control plane signaling from the UE, the acknowledgement message being responsive to the transmitting the second message.

21. The method of claim 11, further comprising:
identifying what policy information the UE is permitted to receive over a control plane, wherein the transmitting the second message is based at least in part on the identifying what policy information the UE is permitted to receive.

22. The method of claim 11, further comprising:
determining whether the UE is in a connected mode or an idle mode, wherein the transmitting the second message is based at least in part on the determining.

23. The method of claim 11, wherein:
the first message is a non-access stratum (NAS) message.

24. An apparatus for wireless communication, comprising:
a processor;
memory in electronic communication with the processor; and
instructions stored in the memory and executable by the processor to cause the apparatus to:
transmit, by a user equipment (UE), a first non-access stratum (NAS) message over a control plane to a core network;
receive, by the UE, a second NAS message over the control plane that includes policy information associated with the UE, the second NAS message being responsive to first NAS message;
identify the policy information based at least in part on receiving the second NAS message; and
update policy information stored by the UE based at least in part on the received policy information.

25. The apparatus of claim 24, wherein the instructions are further executable by the processor to cause the apparatus to:
prioritize the received policy information based at least in part on which core network entity generated the received policy information; and
update the policy information stored by the UE based at least in part on prioritizing the received policy information.

26. The apparatus of claim 24, wherein the instructions are further executable by the processor to cause the apparatus to:
transmit an acknowledgement NAS message over the control plane based at least in part on receiving the second NAS message.

27. The apparatus of claim 24, wherein the instructions are further executable by the processor to cause the apparatus to:
identify a policy provisioning trigger indicating that the UE is to receive the policy information associated with the UE from the core network.

28. An apparatus for wireless communication, comprising:
a processor;
memory in electronic communication with the processor; and
instructions stored in the memory and executable by the processor to cause the apparatus to:
receive a first message via control plane signaling from a user equipment (UE);
identify a policy provisioning trigger indicating that the UE is to receive policy information associated with the UE from a core network based at least in part on receiving the first message;
identify the policy information based at least in part on the policy provisioning trigger; and
transmit a second message via control plane signaling to the UE, the second message including the identified policy information.

* * * * *